US008331318B2

(12) United States Patent
Zhu

(10) Patent No.: US 8,331,318 B2
(45) Date of Patent: Dec. 11, 2012

(54) SYSTEM, METHOD, AND APPARATUS FOR PROVIDING MULTIMEDIA SESSION CONTINUITY

(75) Inventor: Dongming Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 683 days.

(21) Appl. No.: 12/469,424

(22) Filed: May 20, 2009

(65) Prior Publication Data

US 2009/0225725 A1    Sep. 10, 2009

Related U.S. Application Data

(63) Continuation of application No. PCT/CN2007/003341, filed on Nov. 27, 2007.

(30) Foreign Application Priority Data

Nov. 27, 2006   (CN) .......................... 200610149050

(51) Int. Cl.
*H04W 4/00* (2009.01)
*H04L 12/66* (2006.01)
(52) U.S. Cl. ........................................ 370/331; 370/352
(58) Field of Classification Search .................. None
See application file for complete search history.

(56) References Cited

U.S. PATENT DOCUMENTS

2006/0209805 A1 * 9/2006 Mahdi et al. ................. 370/352
2008/0032695 A1 * 2/2008 Zhu et al. ..................... 455/442
2008/0037468 A1 * 2/2008 Zisimopoulos et al. ...... 370/331

FOREIGN PATENT DOCUMENTS

CN    1801998 A    7/2006

OTHER PUBLICATIONS

Office Action in corresponding European Application No. 07845712.4 (Feb. 8, 2011).
Written Opinion of the International Searching Authority in corresponding PCT Application No. PCT/CN2007/003341 (Mar. 20, 2008).
"3GPP TSG SA WG2 Architecture—S2#47—IMS-controlled: Replacing Section 6.3.7: Supplementary Services," SA WG2 Temporary Document, Jun. 27-Jul. 1, 2005, Nortel, Lucent, Huawei, Montreal, Canada.

(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

A system, method, and apparatus for providing multimedia session continuity such that support is provided for a handover of a multimedia session at a multi-mode terminal between bearers of different access modes. The system includes: a remote UE; an MCC UE, adapted to initiate a handover request of the multimedia session between a combination bearer and a multimedia bearer; an MCC, adapted to generate a multimedia handover indication and send it to a DTF according to the handover context information; and the DTF, adapted to carry out a media negotiation with the remote UE based on the multimedia handover indication, and thus the multimedia session between the MCC and the DTF is handed over between different access modes.

18 Claims, 16 Drawing Sheets

OTHER PUBLICATIONS

"3GPP TD 23.206—3rd Generation Partnership Project; Technical Specification Group Services and System Aspects; Voice Call Continuity between CS and IMS; Stage 2 (Release 7)," Jan. 2006, Version 0.2.0, 3rd Generation Partnership Project, Valbonne, France.

"3GPP TS 23.279—3rd Generation Partnership Project; Technical Specification Group Services and System Aspects; Combining CS and IMS services; Stage 2; (Release 7)", Feb. 2005, Version 1.0.0, 3rd Generation Partnership Project, Valbonne, France.

"3GPP TS 24.229—3rd Generation Partnership Project; Technical Specification Group Core Network; IP Multimedia Call Control Protocol based on Session Initiation Protocol (SIP) and Session Description Protocol (SDP); Stage 3 (Release 5)," Jan. 2005, Version 5.11.0, 3rd Generation Partnership Project, Valbonne, France.

"3rd Generation Partnership Project; Technical Specification Group Services and System Aspects; Voice Call Continuity (VCC) between Circuit Switched (CS) and IP Multimedia Subsystem (IMS); Stage 2 (Release 7)," *3GPP*, TS 23.206 V7.0.0: 1-33 (Sep. 2006).

"3rd Generation Partnership Project; Technical Specification Group Services and System Aspects; Combining Circuit Switched (CS) and IP Multimedia Subsystem (IMS) Services; Stage 2 (Release 7)," *3GPP*, TS 23.279 V7.4.0: 1-37 (Sep. 2006).

"3rd Generation Partnership Project; Technical Specification Group Services and Architecture; Feasibility Study on Multimedia Session Continuity; Stage 2 (Release 7)," *3GPP*, TS 23.893 V0.3.0: 1-33 (Oct. 2007).

Schulzrinne et al., "Application-Layer Mobility Using SIP," *Mobile Computing and Communications Review*, 4(3): 47-57 (Jul. 2000).

\* cited by examiner

SYSTEM, METHOD, AND APPARATUS FOR PROVIDING MULTIMEDIA SESSION CONTINUITY

CROSS-REFERENCE TO RELATED APPLICATIONS

This application is a continuation of International Patent Application No. PCT/CN2007/003341, filed Nov. 27, 2007, which claims priority to Chinese Patent Application No. 200610149050.1, filed Nov. 27, 2006, both of which are hereby incorporated by reference in their entirety.

FIELD OF THE TECHNOLOGY

The present invention relates to the field of communications, and more particularly to a system, method, and apparatus for providing multimedia session continuity.

BACKGROUND

In the past, mobile communication operators of one country or region only deploy access networks of one standard. Under this network condition, a user enjoys services through a single-mode terminal. Taking a worldwide view, networks of different standards coexist. With the selections of the operators in deploying networks as well as the mergers and acquisitions between the operators, one operator may operate networks of multiple standards at the same time. On the other hand, the growing demand of the user for mobile applications greatly promotes the rapid development of access technologies, so that many new access technologies, for example, Wireless Fidelity, WiFi, Worldwide Interoperability for Microwave Access, WiMAX, etc., come forth continuously. Therefore, providing the users with a seamless service handover to ensure service continuity under heterogeneous access technologies has become an urgent need for the operators to satisfy the users' requirements and enhance their own competitiveness. Currently, the use of a same set of core networks to support different access technologies and meanwhile support a terminal of different access modes (i.e., a multi-mode terminal, and a CSI terminal and a VCC terminal are both applications of the multi-mode terminal) is put forward to satisfy this need.

The combination of circuit-switched, CS, and Internet protocol, IP, multimedia system, IMS, services (CSI, combining CS bearers with IMS) is proposed by the 3rd Generation Project Partnership, 3GPP, for combining advantages of a CS domain and an IMS domain by enhancing terminal capabilities and providing the users with multimedia service experience in conjunction with an access network and an IMS network entity CSI-application server, CSI-AS, in the circumstance that the access network side supporting a packet-switched, PS, domain cannot bear real-time media. That is, a real-time media component, for example, audio, video, etc., is borne by a call in a CS network, and a non-real-time media component, for example, text, etc., is borne by a session on a packet-based network, and the video may also be borne in the PS domain if it is bearable to the user. Meanwhile, in order to ensure the service experience, the CSI requires that the CS and IMS session must be terminated to the same terminal of a peer end user, and the terminal of the user associates the CS call and the IMS session and provides them to an end user. A combinational service may be generated by adding a CS voice or a multimedia call in the IMS session or adding several IMS sessions to an existing CS voice or multimedia call.

In the above CSI, the CSI-AS has the following functions: (1) selection of whether to combine sessions established on different access networks initiated by the CSI user (when calling) according to network policies; (2) splitting of a received multimedia session to different access networks registered by the CSI terminal for connection (when called); (3) generation of charging information related to the CSI; and (4) supplementary service processing related to the CSI.

In the above CSI, in terms of access network capabilities, in order to associate sessions by using different access technologies at the same time, the CSI requires a GSM/EDGE radio access network, GERAN, network to support the dual transfer mode, DTM, technology, or requires a UMTS terrestrial radio access network, UTRAN, network to support the multi radio access bearer, multi RAB, technology. Furthermore, if it is not limited to the combination between the CS real-time media call and the IMS non-real-time media session, the terminal may also provide an IMS session combination on networks of different access technologies to the user, and such terminal belongs to the CSI terminal in general sense. For example, a session combination between an IMS voice call on a wireless local area network, WLAN, bearer and an IMS text of a PS bearer is provided to the user.

Taking the splitting of the multimedia IMS session by the CSI-AS as an example, referring to FIG. 1, after receiving the multimedia IMS session, the CSI-AS splits the IMS session into a CS call and an IMS call, i.e., bears a real-time media component, for example, audio, video, etc., on a CS network, and bears a non-real-time media component, for example, text, etc., on a packet-based network (the video may also be borne in the PS domain if it is bearable to the user). Meanwhile, in order to ensure the service experience, the CSI requires that the split session be terminated to the same terminal of a peer end user.

The voice call continuity, VCC, is an application provided in a home IMS network of the user, which enables a bi-directional handover of a voice call of the user between the CS domain and the IMS network. The integrated IMS architecture makes it possible to provide a popular Global System for Mobile Communications, GSM, voice call under the WLAN coverage. If the seamless voice call service is realized between the CS domain and an IP connectivity access network, IP-CAN, not only the load of GSM/UMTS radio resources is reduced, but also the gain of the operator is increased. In addition, the wired operator providing the Voice over IP, VoIP, service may also benefit from the integrated services provided by the 3GPP IMS architecture.

FIG. 2 shows an implementation architecture of 3GPP VCC. A set of functional entities are newly added in the IMS domain and the CS domain. Those functional entities are a route switch entity, a CS domain adaptation entity, a domain selection control entity, and a domain handover control entity.

(1) The route switch entity (the customized applications for mobile network enhanced logic, CAMEL, app in FIG. 2) is responsible for switching a CS domain call to the IMS domain to perform a call anchoring control. In general circumstances, the route switch entity is co-installed with the gsm service control function, SCF, in FIG. 2 and embodied as a service control point, SCP, in the CS domain.

(2) The CS domain adaptation entity (the CS adaptation function, CSAF, in FIG. 2) is responsible for receiving the CS domain call switched to the IMS domain and converting the call into an IMS domain call according to stored information (possibly interacting with the CAMEL App).

(3) The domain selection control entity (the domain selection function, DSF, in FIG. 2) is responsible for making a decision according to various policies such as a registration status and a call status of the user in the IMS domain and controlling the call to be routed to a selected connection domain.

(4) The domain handover control entity (the domain transfer function, DTF, entity in FIG. 2) is responsible for anchoring the call in the IMS domain and controlling a handover when the handover occurs.

The above four functional entities are collectively referred to as a VCC service control entity.

Based on the above VCC service control entity, when the VCC terminal is conducting a voice session of an activity, a domain handover is initiated. In order to perform the domain handover, a call initiated or accepted by the VCC terminal are all anchored to a DTF in a home IMS network of the VCC terminal. The DTF is an AS having a 3rd party call control, 3PCC, function. In the VCC, a session control leg between the DTF and the VCC terminal is called an access leg, and the session control leg between the DTF and a remote user is called a remote leg. The handover is exactly using a new access leg to replace an old access leg. In general circumstances, the VCC terminal is able to sense the strength of radio signals of access networks more accurately than a core network, and thus domain handover processes having high requirements for a delay are all initiated from the terminal towards the network. When the VCC terminal of the user detects radio signals and other factors and determines that it needs to hand over from a source network to a destination network, the VCC terminal calls a special number in the destination network. A call request for the special number may be triggered to the DTF for processing. As the original call has already been anchored at the DTF, the DTF associates the old and new calls according to a user identification, ID. A media is renegotiated with the remote user terminal of the original call according to the media in the newly established call, and a media stream corresponding to the handed-over call is switched from a port of a multi-mode terminal in the handover source network to a corresponding port in the handover destination network correspondingly during the media renegotiation process. After the media negotiation is completed, the new call is established successfully, and at this time, the call in the handover source network is released by the DTF or the VCC user equipment, UE. In this manner, the voice call of the user is handed over to the destination network. During the handover, the voice call of the user remains uninterrupted, thereby improving the user's service experience.

FIG. 3 is a flow chart of handing over a call from a CS domain to an IMS domain in the VCC.

(0-1) A VCC UE determines that the call needs to be handed over to the IMS domain according to the wireless environment and calls a special number VCC domain transfer URI, VDI, in the IMS domain to initiate a domain handover. The call request is forwarded from a proxy call session control function, P-CSCF, to a serving call session control function, S-CSCF, in the home IMS network of the VCC user for processing.

(2) The S-CSCF triggers the call to the DTF for processing according to a calling initial Filter Criteria, iFC.

(3) The DTF confirms that the call is a domain handover request according to the VDI in an INVITE, and finds the anchored session according to calling information.

(4-8) The DTF acts as an agent of the user to renegotiate a service data point (SDP) by using media information in the handover request with the remote user.

(9) After the session of the destination network is established, the DTF releases call resources in the access part of the CS domain of the VCC user.

In the process of the invention, the inventor finds that the existing VCC technology only solves the problem of handover of the voice session between bearers of different access modes, and thus can only realize the voice session continuity, but does not support the joint handover of other media sessions (for example, video, text, etc.) combinational with the voice session. That is, the conventional art cannot solve the problem of handover of a multimedia session (including several media sessions that are combinational with each other) on the multi-mode terminal between bearers of different access modes.

SUMMARY

Accordingly, the present invention provides a system, method, and apparatus for providing multimedia session continuity, so as to solve the problem that a handover of a multimedia session on a multi-mode terminal between bearers of different access modes is not supported in the conventional art.

A system is provided in an embodiment of the present invention. The system includes a remote user equipment, UE, and a domain transfer function (DTF) entity of a signaling anchor providing communication between a first access leg and a remote leg. The first access leg is established between the DTF and a multimedia call continuity capable UE, MCC UE, through a combination bearer, the remote leg is established between the DTF and the remote UE, and the MCC UE communicates with the remote UE via the DTF. Afterwards, when a handover occurs the MCC UE is adapted to initiate a second access leg establishment request carrying handover context information and the DTF is adapted to receive the second access leg establishment request carrying the handover context information and establish a second access leg between the MCC UE and the DTF, and perform a media negotiation with the remote UE according to the handover context information and switch the remote leg to the second access leg and the MCC UE continues communicating with the remote UE.

A multi-mode terminal is provided in an embodiment of the present invention. The multi-mode terminal includes an initiating unit, adapted to initiate a handover request for a multimedia session between a combination bearer and a multimedia bearer; an information adding unit, adapted to add handover context information in the handover request initiated by the initiating unit; and a release unit, adapted to release the multimedia session to be handed over before a media negotiation after the media negotiation succeeds.

A media transfer function, MTF, entity is provided in an embodiment of the present invention. The MTF includes an acquisition unit, adapted to acquire handover context information from a multimedia session handover request sent by an MCC UE; a handover indication unit, adapted to accordingly generate a multimedia handover indication and send the indication to a DTF according to the handover context information acquired by the acquisition unit, so as to map an establishment process of a multimedia session between the MCC UE and the MCC on a combination bearer to an establishment process of a multimedia session between the MCC and the DTF on a multimedia bearer; and a release unit, adapted to release a multimedia session to be handed over before a media negotiation after the media negotiation succeeds.

A domain transfer function, DTF, entity is provided in an embodiment of the present invention. The DTF includes a multimedia session negotiation unit, adapted to receive a second access leg establishment request carrying handover context information and establish a second access leg between the multimedia session negotiation unit and an MCC UE, and to perform a media negotiation with a remote UE according to the handover context information and switch a remote leg to the second access leg so that the MCC UE continues communicating with the remote UE; and a release unit, adapted to release a multimedia session to be handed over before the media negotiation after the media negotiation succeeds.

A method is provided in an embodiment of the present invention. The method provides a DTF of a signaling anchor providing communication between a first access leg and a remote leg. The first access leg is established between the DTF and an MCC UE through a combination bearer, the remote leg is established between the DTF and a remote UE, and the MCC UE communicates with the remote UE via the DTF. A handover process occurring afterwards includes the following steps. The DTF receives a second access leg establishment request carrying handover context information initiated by the MCC UE and establishes a second access leg between the MCC UE and the DTF. The DTF performs a media negotiation with the remote UE according to the handover context information and switches the remote leg to the second access leg so and the MCC UE continues communicating with the remote UE.

Another system is provided in an embodiment of the present invention. The system includes a remote UE and a DTF entity of a signaling anchor providing communication between a first access leg and a remote leg. The first access leg is established between the DTF and the MCC UE through a multimedia bearer, the remote leg is established between the DTF and the remote UE, and the MCC UE communicates with the remote UE via the DTF. Afterwards, when a handover occurs, the MCC UE is adapted to initiate a second access leg establishment request carrying handover context information, and the DTF is adapted to receive the second access leg establishment request carrying the handover context information and establish a second access leg between the MCC UE and the DTF, and perform a media negotiation with the remote UE according to the handover context information and switch the remote leg to the second access leg and the MCC UE continues communicating with the remote UE.

Another method is provided in an embodiment of the present invention. The method provides a DTF of a signaling anchor providing communication between a first access leg and a remote leg. The first access leg is established between the DTF and an MCC UE through a multimedia bearer, the remote leg is established between the DTF and a remote UE, and the MCC UE communicates with the remote UE via the DTF. A handover process occurring afterwards includes the following steps. The DTF receives a second access leg establishment request carrying handover context information initiated by the MCC UE and establishes a second access leg between the MCC UE and the DTF. The DTF performs a media negotiation with the remote UE according to the handover context information and switches the remote leg to the second access leg and the MCC UE continues communicating with the remote UE.

In the embodiments of the present invention, an MCC UE is newly added to initiate a handover request for a multimedia session between a combination bearer and a multimedia bearer and carry handover context information in the handover request. Besides, the function of an MCC is added. The MCC generates a multimedia handover indication and sends the indication to a DTF according to the handover context information, so as to map a process that a multimedia session between the MCC UE and the MCC is handed over between the combination bearer and the multimedia bearer to a process that a multimedia session between the MCC and the DTF is handed over between different access modes. Moreover, the function of the DTF is added. The DTF performs a media negotiation with a remote UE according to the handover information sent by the MCC UE or the multimedia handover indication sent by the MCC, so as to complete the handover of the multimedia session between the MCC and the DTF between different access modes.

Therefore, the problem of an unlimited number of bi-directional handovers of a multimedia session on a multi-mode terminal between bearers of different access modes is solved without influencing the existing flow of the VCC, thereby providing call continuity for the multimedia session of the multi-mode terminal. As such, the call continuity capability is enhanced, the provision scope of the call continuity by the operator is expanded, and thus the scale of the service profit is potentially increased.

BRIEF DESCRIPTION OF THE DRAWINGS

FIG. 1 is a schematic view of a splitting of a multimedia IMS session by a CSI-AS;

DETAILED DESCRIPTION

The present invention enables a multimedia session on a multi-media terminal to be handed over between bearers of different access modes.

Figure 1:
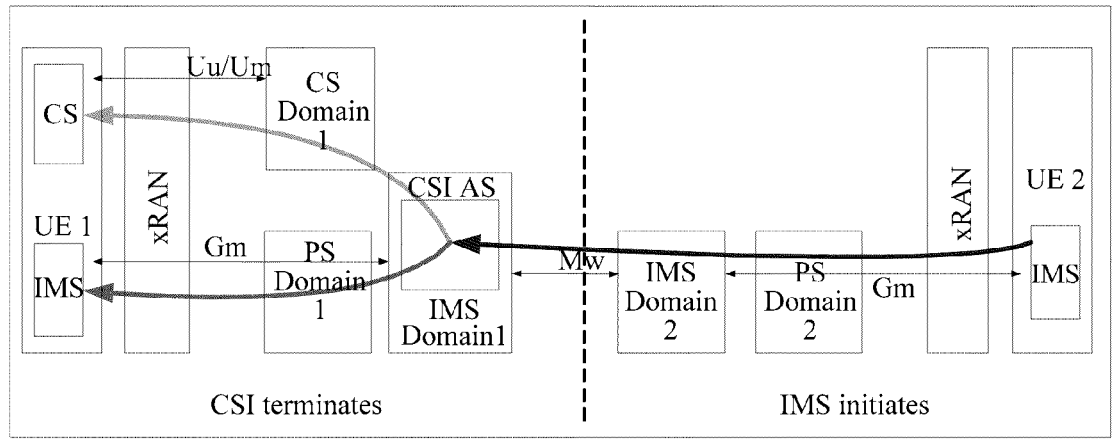
Figure 2:
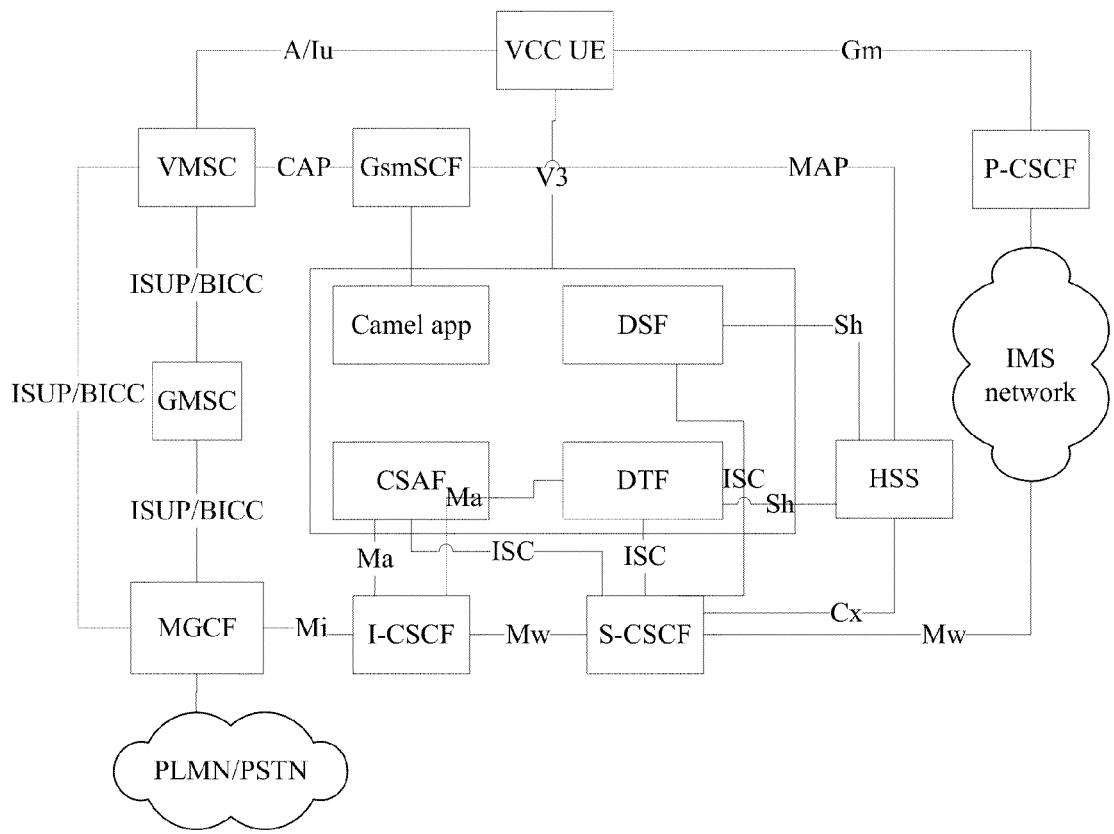
FIG. 2 is a schematic view of an implementation architecture of an existing 3GPP VCC.
Figure 3:
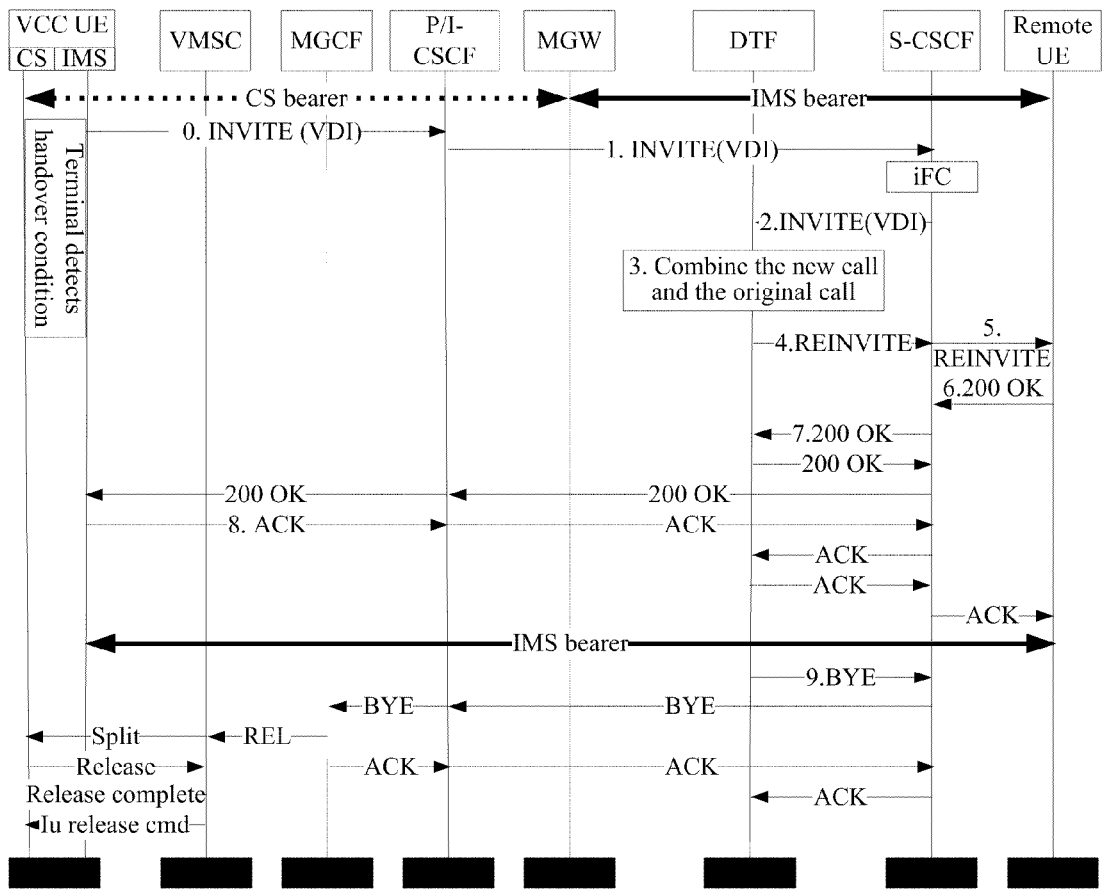
FIG. 3 is a flow chart of a handover of a call from a CS domain to an IMS domain in the existing VCC.
Figure 4:
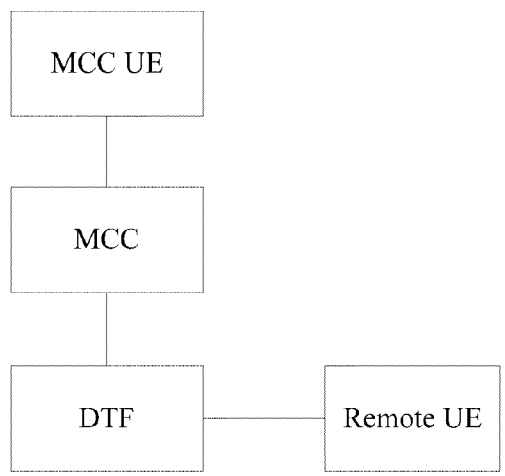
FIG. 4 is a schematic structural view of a system according to an embodiment of the present invention.

In order to achieve the above objective, in an embodiment of the present invention, a system for providing multimedia session continuity is provided. Referring to FIG. 4, the system includes an MCC UE, an MCC, a DTF, and a remote UE providing communication between each other according to a logical relation. Further, a network interworking entity may also be included between the MCC UE and the MCC.

The MCC UE, at least supporting three access modes, is adapted to initiate a handover request for a multimedia session (the multimedia session is represented as a combination of sessions respectively borne on a combination bearer when provided to a user on the combination bearer; substantially, one multimedia session is performed with a peer end user, and is provided on the combination bearer after being split due to access network capabilities only at a user side of the multimode terminal) between the combination bearer and a multimedia bearer, and carry handover context information in the handover request.

Further, the MCC UE initiates a bi-directional handover of the multimedia session between the combination bearer and the multimedia bearer. The combination bearer is a combination of at least two access network bearer modes jointly bearing the multimedia session, and the multimedia bearer is an access network bearer mode capable of bearing the multimedia session alone.

Based on the above explanation of the combination bearer and the multimedia bearer, when the direction of the handover request is from the multimedia bearer to the combination bearer, it is possible that the combination bearer cannot completely bear a previous multimedia session and a quality degradation handover is needed (quality degradation denotes that a multimedia component loses some media components according to a policy after being handed over). Therefore, the MCC UE first determines whether a multimedia session quality needs to be degraded before initiating a handover request. The MCC UE carries related information of a media session capable of being handed over and a quality degradation indication in handover context information according to a determined result. The determining whether the multimedia session quality needs to be degraded includes one of the following policies: determining whether the capability of a handover destination side supports a current multimedia session attribute, and if the capability of a handover destination side does not support a current multimedia session attribute, carrying an intersection part between the capability of the handover destination side and the current multimedia session attribute in the handover context information; degrading the multimedia session quality configured by the MCC UE according to a policy; and according to a user's indication.

Further, as an optimized processing, when the MCC UE acts as a callee, in a call establishment process, the MCC notifies whether sessions on the combination bearer between the MCC and the MCC UE are corresponding to one multimedia session between the MCC and the remote UE; and when the MCC UE intends to initiate a multimedia session handover request for handing over the combination bearer to the multimedia bearer, the MCC UE initiates one handover request if the sessions are corresponding to one multimedia session between the MCC and the remote UE. Otherwise, the MCC UE respectively initiates handover requests (not limited to two handover requests) for the sessions on the combination bearer.

The different access modes of the MCC UE respectively support an interaction with the MCC through CS domain signaling or session initiation protocol, SIP, signaling. If the MCC UE interacts with the MCC through the CS domain signaling, the MCC is reached after the network interworking entity completes a conversion from the CS domain signaling to the SIP signaling in an IMS network.

The MCC has several functions added thereto based on the CSI AS. Placed in a session path between the MCC UE and the DTF, the MCC is adapted to generate a multimedia handover indication and send the indication to the DTF according to the handover context information, so as to map an establishment process of a multimedia session (i.e., an access control leg) between the MCC UE and the MCC on the combination bearer to an establishment process of a multimedia session between the MCC and the DTF on the multimedia bearer.

Further, corresponding to the quality degradation operation of the MCC, after the MCC receives the handover request and identifies that the quality degradation indication is carried in the handover request, the MCC directly generates the multimedia handover indication and sends the indication to the DTF according to the related information of the media session capable of being handed over carried in the handover context information in the received handover request without waiting for the handover requests of other combinational sessions.

Moreover, corresponding to the optimized processing of the number of the handover request initiated by the MCC, in a call establishment process, the MCC notifies the MCC UE of information whether sessions on the combination bearer between the MCC and the MCC UE are corresponding to one multimedia session between the MCC and the remote UE (i.e., combinational session information) so that the MCC UE accordingly determines the number of the initiated handover request.

Placed in a session path between the MCC and the remote UE, the DTF is adapted to perform a media negotiation with the remote UE according to the multimedia handover indication, so as to complete a handover between different access modes of the multimedia session between the MCC and the DTF.

If the MCC UE interacts with the MCC through the CS domain signaling, the network interworking entity is adapted to complete a conversion between the CS domain signaling and the SIP signaling in the IMS domain.

According to different directions in which the handover request is initiated and different media negotiation modes, the above MCC UE, MCC, and DTF may all initiate the release of the multimedia session to be handed over before the media negotiation after the media negotiation succeeds.

In the specific implementation, the MCC has multiple deployment manners. The MCC may be an AS (including being used as an AS alone or co-installed with other network elements, NEs, as an AS), and is ensured to be invoked by the network through an initial Filter Criteria, iFC, triggering mechanism. Or the MCC is used as a transit entity for exchanging signaling between the MCC UE and the network, and is ensured to be invoked by the network. The system provided by the present invention is illustrated in detail below with four embodiments of the system.

Figure 5:
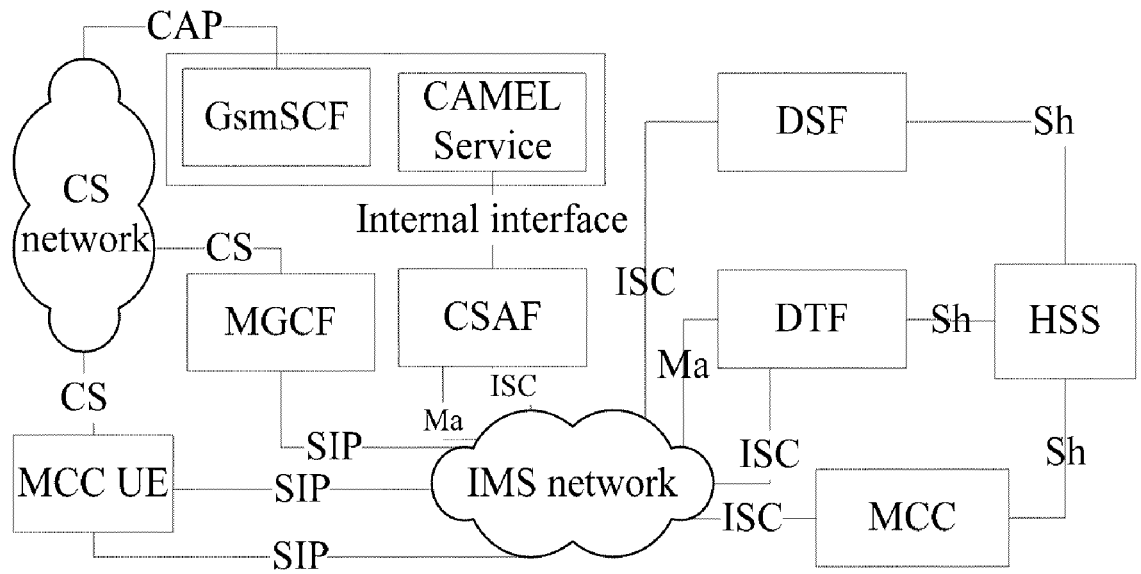
FIG. 5 is a schematic view of a system according to a first embodiment of the present invention.

In a system according to a first embodiment, the MCC is used as a single AS, as shown in FIG. 5.

In the system of this embodiment, the MCC communicates with a home subscriber server, HSS, in the network via an Sh interface defined in the IMS network, the MCC directly or indirectly communicates with other entities in the IMS network (including indirectly communicating with the DTF) via an ISC interface in the IMS network that employs the SIP protocol, the gsmSCF interacts with the CAMEL Service via an internal interface, and the CAMEL service interacts with a CSAF via an internal interface. A media gateway control function, MGCF, belongs to an interworking functional entity of the CS signaling and the SIP signaling.

When the system of this embodiment is implemented, the MCC is invoked by the network when a call reaches the MCC through the iFC triggering mechanism, and is ensured to be closer to a user side in the call through an iFC priority processing. That is, when the MCC UE acts as a caller, the MCC is invoked by the network before the DTF through the iFC triggering mechanism, and when the MCC UE acts as a callee, the MCC is invoked by the network after the DTF through the iFC triggering mechanism.

Figure 6:
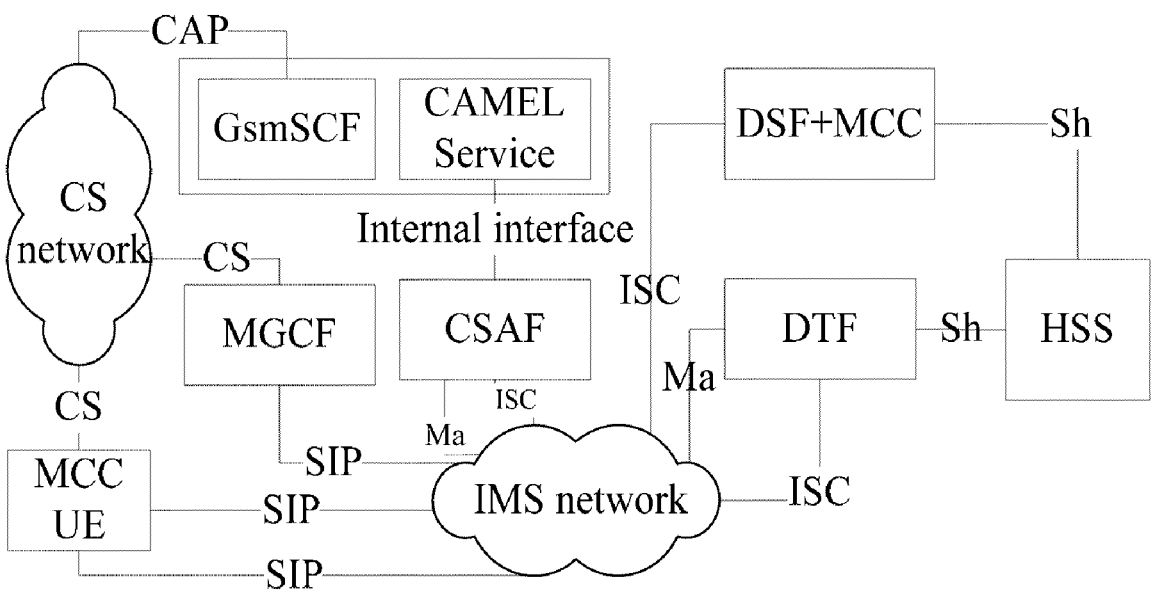
FIG. 6 is a schematic view of a system according to a second embodiment of the present invention.

In a system according to a second embodiment, the MCC is co-installed with the DSF as an AS, as shown in FIG. 6.

In this embodiment of the system, the MCC directly or indirectly communicates with an entity in the IMS network (including indirectly communicating with the DTF) via existing interfaces of the DSF which are respectively the ISC and Sh, the gsmSCF interacts with the CAMEL Service via an internal interface, and the CAMEL Service interacts with a CSAF via an internal interface. An MGCF belongs to an interworking functional entity of the CS signaling and the SIP signaling.

When this embodiment of the system is implemented, the MCC is invoked by the network when a call reaches the co-installed AS through the iFC triggering mechanism, and is ensured to be closer to a user side in the call through an iFC priority processing. That is, when the MCC UE acts as a caller, the co-installed AS is invoked by the network before the DTF through the iFC triggering mechanism, and when the MCC UE acts as a callee, the co-installed AS is invoked by the network after the DTF through the iFC triggering mechanism.

Figure 7:
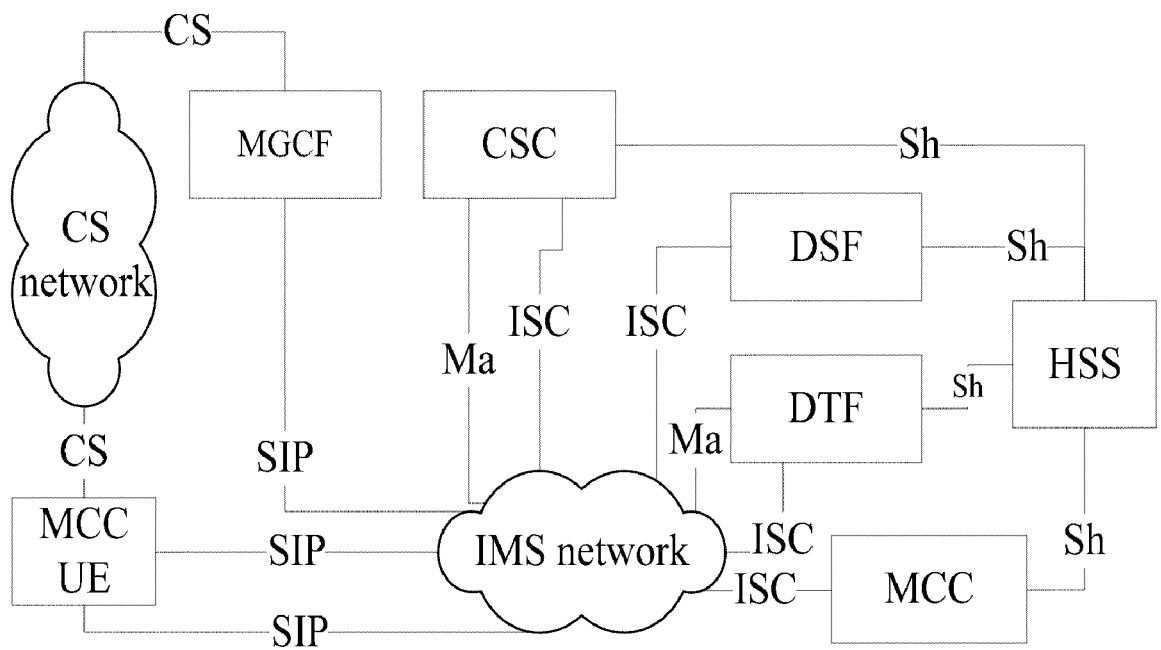
FIG. 7 is a schematic view of a system according to a third embodiment of the present invention.

In a third embodiment according to a system, the MCC is used as a single AS, and the MCC UE supports the control of a call establishment and service control in the CS bearer through SIP signaling of a PS access bearer, as shown in FIG. 7.

In this embodiment of the system, as an independent AS, the MCC communicates with an S-CSCF via an ISC interface defined in the IMS specification, and delivers required handover and session control information with the DTF via the ISC interface. Optionally, the MCC supports an Ma interface to address in a PSI manner. Optionally, the MCC supports a Sh interface with an HSS.

The CSC works in conjunction with the MCC UE to control the session establishment and service control on the UE CS bearer through the SIP signaling on the MCC UE PS access bearer. Optionally, a Sh interface with an HSS is supported. In order to control the call establishment on the CS bearer, the CSC is closer to the UE than the MCC.

When this embodiment of the system is implemented, the MCC is ensured to be always invoked at a location closer to the UE than the DTF through the iFC triggering mechanism. That is, when the MCC UE acts as a caller, the MCC is invoked by the network before the DTF through the iFC triggering mechanism, and when the MCC UE acts as a callee, the MCC is invoked by the network after the DTF through the iFC triggering mechanism. In a similar way, the CSC is ensured to be invoked at a location closer to the UE than the MCC.

In the specific implementation, the following possible combination manners still exist: (1) the CSC and the MCC are combined into an AS; or (2) the CSC, the DSF, and the MCC are combined into an AS; or (3) the MCC, the CSC, the DSF, and the DTF are combined into an AS; or (4) this embodiment of the system may also be combined with the first embodiment of the system, and the CSC and the MCC are combined into an AS; or (5) this embodiment of the system may also be combined with the first embodiment of the system, and the CSC, the MCC, and the DSF are combined into an AS; or (6) this embodiment of the system may also be combined with the first embodiment of the system, and the CSC, the MCC, the DSF, and the DTF are combined into an AS.

Figure 8:
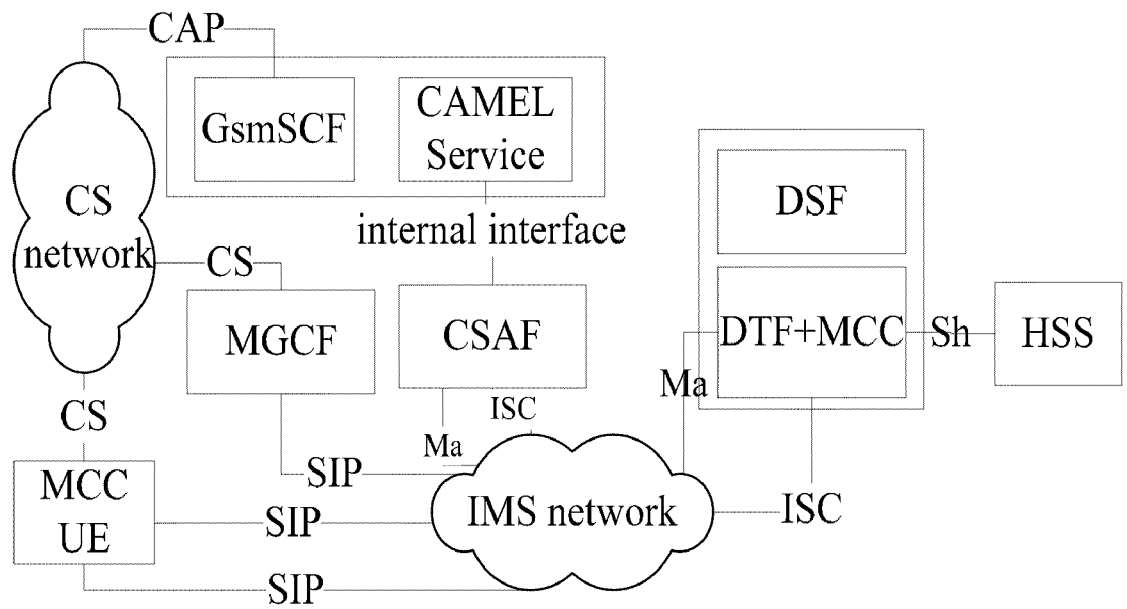
FIG. 8 is a schematic view of a system according to a fourth embodiment of the present invention.

In a fourth embodiment according to a system, the MCC is co-installed with the DTF as an AS, as shown in FIG. 8.

In this embodiment of the system, the DTF and the DSF employ an internal interface there-between. The MCC communicates with an entity in the IMS network via existing interfaces in the DTF that are respectively an ISC, an Sh, and an Ma, the gsmSCF interacts with the CAMEL Service via an internal interface, and the CAMEL service interacts with the CSAF via an internal interface. The MGCF belongs to an interworking functional entity of the CS signaling and the SIP signaling.

When this embodiment of the system is implemented, the MCC is invoked by the network when a call reaches the co-installed AS through the iFC triggering mechanism, and communicates with the DTF via an internal interface, and the MCC logic is ensured to be invoked closer to a user side through an internal logic. That is, when the MCC UE acts as a caller, the MCC is invoked by the network before the DTF through the internal logic of the co-installed AS, and when the MCC UE acts as a callee, the MCC is invoked by the network after the DTF through the internal logic of the co-installed AS.

Figure 9:
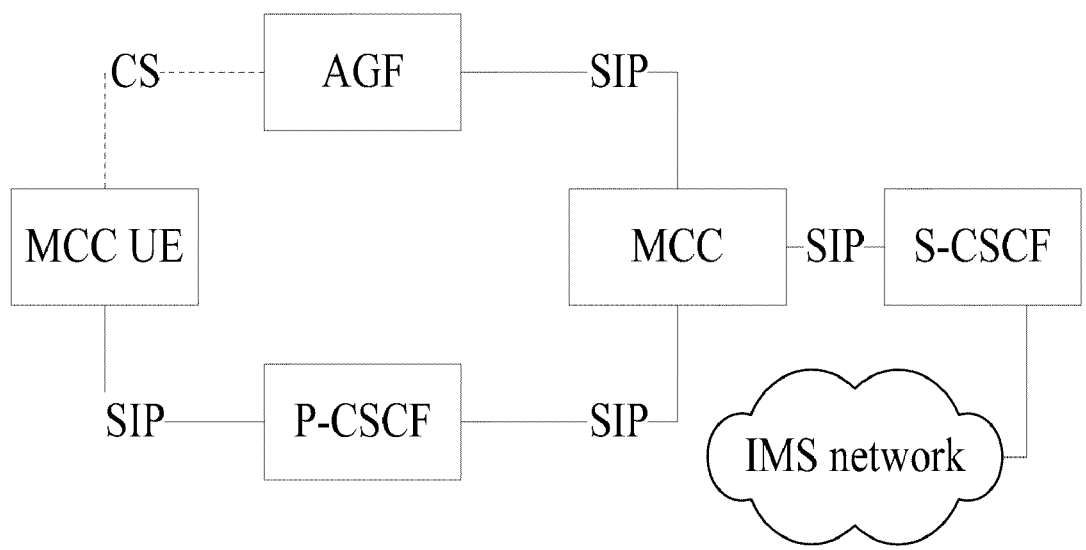
FIG. 9 is a schematic view of a system according to a fifth embodiment of the present invention.

In a fifth embodiment according to a system, the MCC is used as a transit entity for exchanging signaling between the MCC UE and the network, as shown in FIG. 9.

In this embodiment of the system, the MCC is inserted between signaling routes of the P-CSCF and the S-CSCF through a special registration flow, and can definitely be inserted into any call path originated and terminated by the MCC UE. An access gateway function, AGF is responsible for the conversion of the call signaling in the CS domain and the SIP signaling.

The special registration flow is, for example, configuring data at the S-CSCF. After receiving a registration request from the user and completing an authentication, the S-CSCF carries an address of the MCC UE to register with the MCC. After the registration is completed, the address of the MCC is returned to the MCC UE as an address of the S-CSCF, and the S-CSCF clears previous registration information of the user. The MCC acts as an agent of the user to initiate a registration with the S-CSCF. The S-CSCF adopts the address of the MCC as the address of the MCC UE. In this manner, the MCC is placed between the MCC UE and the S-CSCF.

When this embodiment of the system is implemented, the call is invoked by the network when reaching the MCC.

Figure 10:
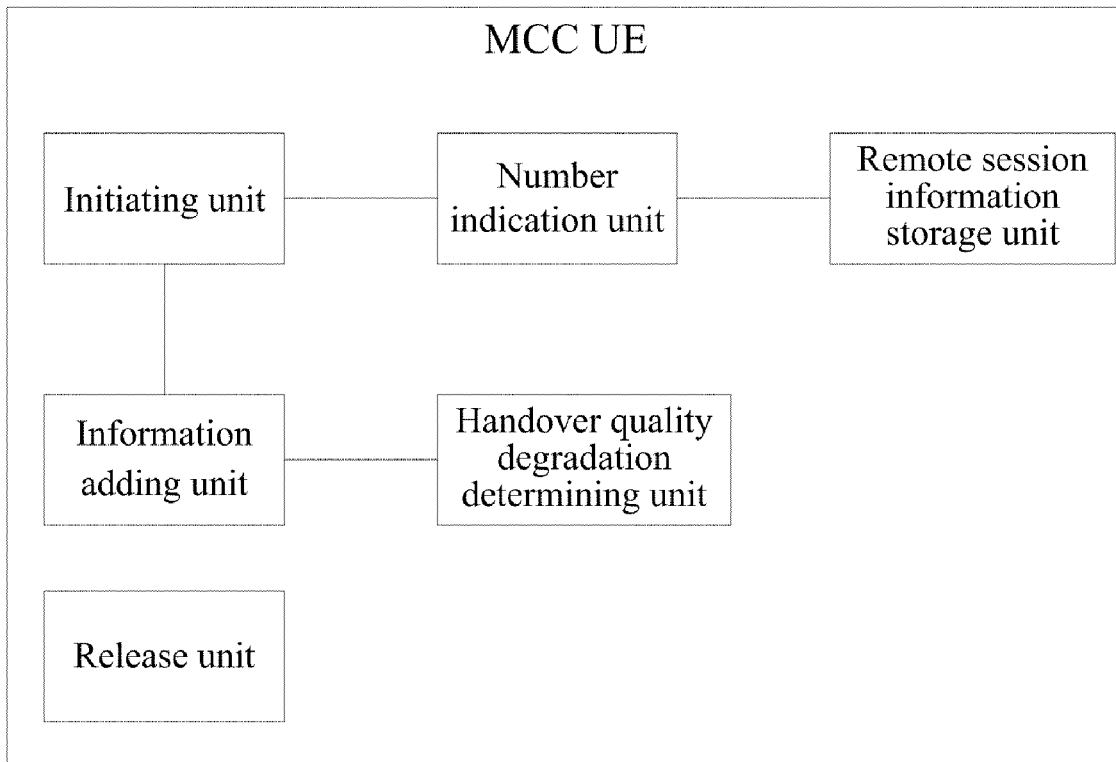
FIG. 10 is a schematic structural view of an MCC UE according to an embodiment of the present invention.

Corresponding to the above system, an MCC UE is further provided in an embodiment of the present invention. Referring to FIG. 10, the MCC UE includes an initiating unit and an information adding unit providing communication between each other, a release unit, a handover quality degradation determining unit connected to the information adding unit, and a remote session information storage unit and a number indication unit connected to each other. The number indication unit is further connected to the initiating unit.

The initiating unit is adapted to initiate a handover request for a multimedia session between a combination bearer and a multimedia bearer.

The information adding unit is adapted to add handover context information in the handover request initiated by the initiating unit.

The handover quality degradation determining unit is adapted to determine whether a multimedia session quality needs to be degraded before the initiating unit initiates the handover request, and notify the information adding unit to carry related information of a media session capable of being handed over in the handover context information according to a determined result.

The remote session information storage unit is adapted to store information sent from a network side notifying whether sessions on different bearers between an MCC and the MCC UE are corresponding to the same multimedia session between the MCC and a remote UE in a call establishment process when the MCC UE acts as a callee, and the MCC UE determines according to the information that the sessions on different bearers are combinational sessions with each other and the corresponding bearers are combinational bearers with each other.

The number indication unit is adapted to indicate the number of the handover request initiated by the initiating unit according to the information stored by the remote session information storage unit when the initiating unit intends to initiate a handover request for handing over the combination bearer to the multimedia bearer.

The release unit is adapted to release the multimedia session to be handed over before a media negotiation after the media negotiation succeeds.

Figure 11:
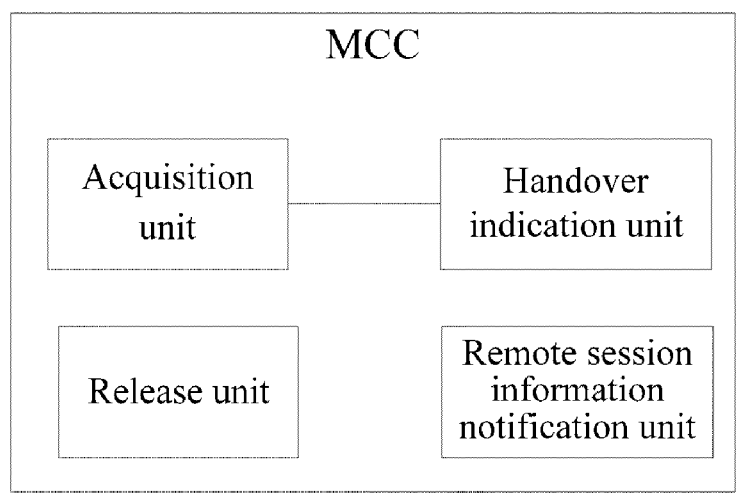
FIG. 11 is a schematic structural view of an MCC according to an embodiment of the present invention.

Corresponding to the above system, an MCC is further provided in an embodiment of the present invention. Referring to FIG. 11, the MCC includes an acquisition unit and a handover indication unit providing communication between each other, a release unit, and a remote session information notification unit.

The acquisition unit is adapted to acquire handover context information from a multimedia session handover request sent from the MCC UE.

The handover indication unit is adapted to generate a multimedia handover indication and send the indication to a DTF according to the handover context information acquired by the acquisition unit, so as to map an establishment process of a multimedia session between the MCC UE and the MCC on a combination bearer to an establishment process of a multimedia session between the MCC and the DTF on a multimedia bearer.

The release unit is adapted to release a multimedia session to be handed over before a media negotiation after the media negotiation succeeds.

The remote session information notification unit is adapted to notify the MCC UE information whether sessions on different bearers between the MCC and the MCC UE are corresponding to the same multimedia session between the MCC and a remote UE in a call establishment process when the MCC UE acts as a callee (i.e., the MCC UE determines according to the information that sessions on different bearers are combinational sessions with each other and the corresponding bearers are combinational bearers with each other).

Figure 12:
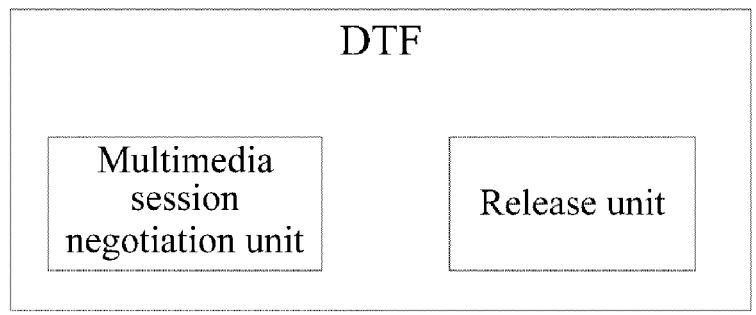
FIG. 12 is a schematic structural view of a DTF according to an embodiment of the present invention.

Corresponding to the above system, a DTF is further provided in an embodiment of the present invention. Referring to FIG. 12, the DTF includes a multimedia session negotiation unit and a release unit providing communication between each other.

The multimedia session negotiation unit is adapted to perform a media negotiation with a remote UE according to a multimedia handover indication sent from a front end.

The release unit is adapted to release a multimedia session to be handed over before the media negotiation after the media negotiation succeeds.

Figure 13:
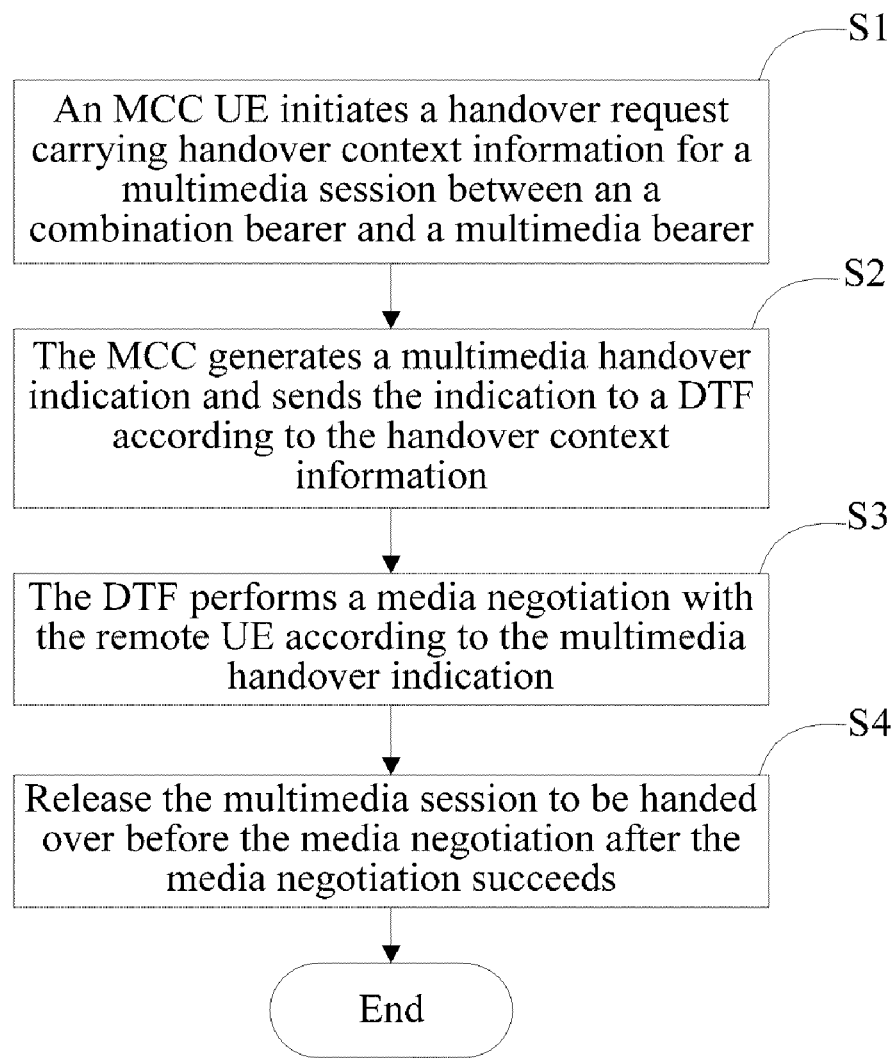
FIG. 13 is a flow chart of a method according to an embodiment of the present invention.

A method for providing multimedia session continuity is further provided in an embodiment of the present invention. Referring to FIG. 13, the method mainly includes the following steps.

In S1, an MCC UE initiates a handover request carrying handover context information for a multimedia session between a combination bearer and a multimedia bearer. The information includes: a handover indication including, but not limited to, indication denoted by calling a special called number, information of a media supported by the MCC UE in a bearer network established with a new access leg and corresponding to a media to be handed over, SDP information mapped to an IMS network or bearer capability information in the CS, identification information of the media to be handed over for locating an original session where the media to be handed over resides for handover, which may be formed by combining port information in the SDP of the media to be handed over or an ID of a session thereof with an ID of the media in the session or denoted in other forms, and optionally, combinational session handover indication information for indicating whether any other combinational session is handed over correspondingly.

The handover direction for the handover of the multimedia session between the combination bearer and the multimedia bearer includes a bi-directional handover between the combination bearer and the multimedia bearer. The combination bearer is a combination of at least two access network bearer modes jointly bearing the multimedia session. The multimedia bearer is an access network bearer mode capable of bearing the multimedia session alone.

When the MCC UE initiates the handover request in an access network where the multimedia bearer resides (i.e., the direction of the requested handover is from the combination bearer to the multimedia bearer), the MCC UE determines whether sessions currently distributed in different access networks are combinational sessions with each other before initiating the handover request, and if the sessions are combinational sessions with each other, initiates one handover request for the combinational sessions. Or, the MCC UE directly initiates a handover request for combinational sessions, and the MCC determines the combination.

In S2, the MCC generates a multimedia handover indication and sends the indication to a DTF according to the handover context information.

The process that the MCC generates the multimedia handover indication according to the handover context information is to map an establishment process of a multimedia session between the MCC UE and the MCC on the combination bearer to an establishment process of a multimedia session between the MCC and the DTF on the multimedia bearer.

When the DTF is capable of identifying the requested session, this step may also be omitted, i.e., the handover request initiated by the MCC UE is directly processed by the DTF. In a system corresponding to this case, an MCC UE is adapted to initiate from a multimedia bearer a handover request carrying handover context information for a multimedia session from a combination bearer to the multimedia bearer; a DTF is adapted to receive the handover request and perform a media negotiation with a remote UE according to the handover context information in the handover request, so as to complete the handover of the multimedia session from the combination bearer to the multimedia bearer, and an MCC, placed in a session path between the MCC UE and the DTF, is adapted to release a session on the combination bearer after receiving a release indication from the DTF.

In S3, the DTF performs a media negotiation with the remote UE according to the multimedia handover indication.

The mode for the DTF to perform the media negotiation with the remote UE according to different multimedia handover indications sent from the MCC or the MCC UE includes parallel media negotiation and serial media negotiation.

In S4, the multimedia session to be handed over before the media negotiation is released after the media negotiation succeeds.

According to different directions in which the handover request is initiated and different media negotiation modes, the above MCC UE, MCC, and DTF may all initiate the release of the multimedia session to be handed over before the media negotiation after the media negotiation succeeds.

Different handover directions and media negotiation modes are specifically illustrated below.

In Step S1, the MCC UE initiates the handover request in an access network where the multimedia bearer resides (i.e., the direction of the requested handover is from the combination bearer to the multimedia bearer (for example, a WLAN bearer)), the following cases exist.

Figure 14:
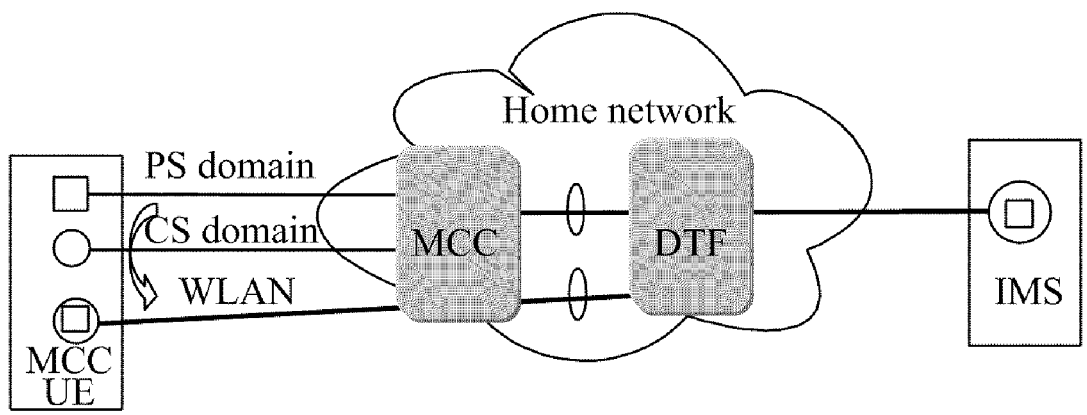
FIG. 14 is a schematic view illustrating a situation in which the MCC UE directly initiates a handover request for combinational sessions in an access network where a multimedia bearer resides according to an embodiment of the present invention.

In a first case, referring to FIG. 14, the square denotes a non-real-time media, the circle denotes a real-time media, the circle enclosed square denotes a multimedia, and two ellipses denote two sessions for the DTF. The MCC UE directly initiates a handover request for combinational sessions on a CS bearer and a handover request for combinational sessions on a PS bearer, and the MCC determines a combination and combines the above two handover requests to perform a handover on the multimedia bearer (the WLAN bearer). The respective bearing of real-time and non-real-time media in the CS and PS is merely taken as an example for illustration herein, and the present invention is not limited thereto. According to the following different cases, the MCC entity may also not be placed in a signaling path of the handover request initiated by the MCC UE through the multimedia bearer.

The handover request carries handover context information at least including: a session handover indication (denoted by a special called number or by an SIP message name, parameter, or header field), information of a multimedia component (including a media format, a port, and any other related attribute) supported by the MCC UE in a multimedia bearer network, an ID of a media to be handed over (that may be an ID of a session where the media resides plus a media attribute or specific port information of an independent media), and an indication of whether any other media component needs to be handed over.

In Step S2, after receiving one of the handover requests on the combination bearer, the MCC determines whether all related handover requests have been received according to the indication whether any other media component needs to be handed over; determines whether media sessions corresponding to the handover requests are combinational sessions with each other according to the fact whether the handover requests are directed to the same multimedia session established by the same remote UE when determining that all the related handover requests are received; and if the media sessions are combinational sessions with each other, the MCC combines the handover context information in the handover requests to generate a multimedia handover indication (the multimedia handover indication includes a media component that is supported in a handover destination network provided by the MCC UE and an ID of a session to be handed over between the MCC and the DTF) and send the indication to the DTF.

In Step S3, the DTF performs a media negotiation with the remote UE according to the multimedia handover indication, and after the media negotiation is successful, Step S4 is performed.

In Step S4, the releasing the multimedia session to be handed over before the media negotiation includes one of the following manners. If the DTF initiates the release, the MCC respectively releases the combinational sessions after receiving a release message sent from the DTF. If the MCC UE initiates the release, the MCC releases a session between the MCC and the DTF after releasing the combinational sessions.

In a second case, the MCC UE determines whether sessions currently distributed in different access networks are combinational sessions with each other before initiating the handover request, and if the sessions are combinational sessions with each other, initiates one handover request for the combinational sessions.

The MCC UE determines the combinational sessions in one of the following manners. When the MCC UE acts as a caller, the MCC UE is capable of knowing whether the sessions distributed in different access networks initiated by a local end are directed to the same destination user and thus are combinational sessions with each other. When the MCC UE acts as a callee, the MCC notifies the MCC UE of combinational session information in a session establishment process, and the MCC UE determines whether the sessions currently distributed in different access networks are combinational sessions with each other according to the combinational session information notified by the MCC. The MCC UE always considers that the sessions currently distributed in different access networks are combinational sessions with each other according to a configured policy.

The handover request carries handover context information at least including: a session handover indication, attribute information of a media supported by the MCC UE in a multimedia bearer network and corresponding to a media component to be handed over, and identification information of a media to be handed over (that is, denoted by port information of the media or an ID of a session where the media resides plus an ID of the media for locating an ID of combinational sessions or an ID of a multimedia session corresponding to the combinational sessions).

In this case, specifically, the following steps are included.

In Step A, when detecting the need of a handover to the multimedia bearer, the MCC UE calls a domain handover number/ID in an IMS network and carries handover context information.

B1 and B2 branches may be taken respectively according to different information that is carried.

In Step B1, after the call is triggered to the MCC and received by the MCC, the MCC identifies a handover request for combinational sessions, locates a multimedia session between the MCC and the DTF that are combinational with the two sessions according to the information and generates a multimedia handover indication (the multimedia handover indication includes a media component that is supported in the handover destination network provided by the MCC UE and an ID of a session to be handed over between the MCC and the DTF), and initiates a session request to the DTF by carrying the generated information and forwards the session request to the DTF via the IMS network.

In Step B2, the handover request carries the ID of the multimedia session corresponding to the combinational sessions and can be identified by the DTF so that the request is directly triggered to the DTF for processing.

In Step C, after receiving the session request carrying the multimedia handover indication, the DTF finds a session with a remote user according to an original session ID in the session request, and updates a media according to an SIP media change flow.

In Step D, after the media is updated, a session/call on the old bearer (to be handed over before the media negotiation) is released. The releasing the multimedia session to be handed over before the media negotiation includes one of the following manners. If the DTF initiates the release, the MCC respectively releases the combinational sessions after receiving a release message sent from the DTF. If the MCC UE initiates the release, the MCC releases a session between the MCC and the DTF after releasing the combinational sessions.

If in Step S1, the MCC UE initiates the handover request in an access network where the combination bearer resides (i.e., the direction of the requested handover is from the multimedia bearer to the combination bearer).

Moreover, the MCC instructs the DTF to perform a media negotiation with the remote user in a mode of parallel media negotiation after receiving the handover request for the combinational sessions. The respective bearing of real-time and non-real-time media in the CS and PS is merely taken as an example for illustration herein, and the present invention is not limited thereto. According to the following different cases, the MCC entity may also not be placed in a signaling path of a session performed by the MCC UE through the multimedia bearer.

Figure 15:
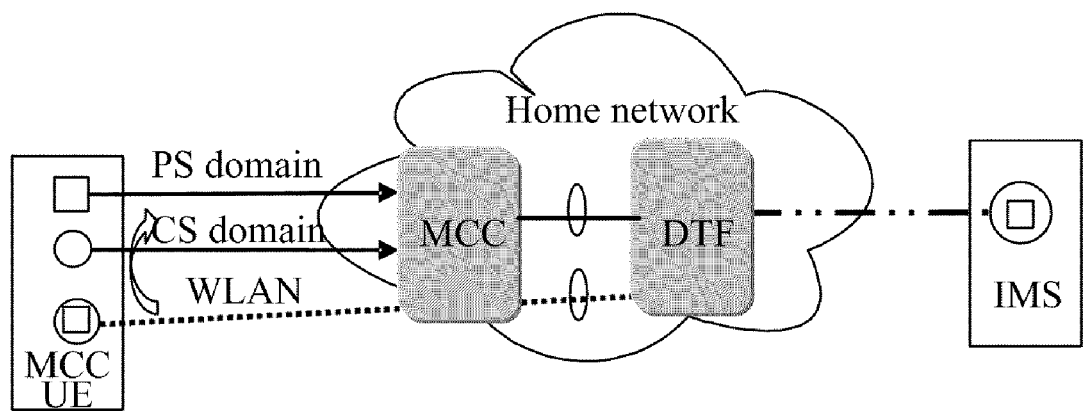
FIG. 15 is a schematic view illustrating a first manner for initiating the handover request in an access network where a combination bearer resides by the MCC UE according to an embodiment of the present invention.

A first manner for initiating a handover request for a multimedia session is shown in FIG. 15. The square denotes a non-real-time media, the circle denotes a real-time media, the circle enclosed square denotes a multimedia, and two ellipses denote two sessions for the DTF. The MCC UE initiates handover requests for a real-time media session and a non-real-time media session correspondingly in a destination side network.

The handover request carries handover context information at least including: a session handover indication, information of a multimedia component supported by the MCC UE in the destination side network, and an ID of a session where a media to be handed over resides (or other combinational information with the media to be handed over) for associating sessions to be handed over on an access leg (between the MCC and the MCC UE) at the MCC, i.e., the ID of the session denoted by the square dotted line in FIG. 15. The ID of the session to be handed over may be a CALL-ID header field in the SIP or an ID allocated and delivered between the MCC and the MCC UE by themselves. The MCC UE and the MCC respectively maintain the ID and a real corresponding relation between sessions (in the IMS network, the UE may receive multiple IMS sessions correspondingly). Particularly, when a handover source network has only one multimedia session, the above information is not needed. The handover context information also includes an indication of whether any other media component needs to be handed over.

The initiating the handover request for the multimedia session in the first manner includes the following steps.

In Step A, the MCC UE calls handover numbers/IDs denoting networks of session handovers on a real-time and a non-real-time media handover destination network correspondingly, and respectively carries required handover context information.

In Step B, after receiving any one of the above requests, the MCC waits for the other handover request according to the indication whether any other media component needs to be handed over. After receiving the two handover requests of the real-time and non-real-time media, the MCC determines whether the two requests are combinational according to identification information of sessions to be handed over carried in the two handover requests (or, if a result obtained from a calculation of combinational information carried in the handover requests by the MCC according to a configured rule is a specific value, the MCC determines that the media sessions corresponding to the handover requests are combinational sessions with each other). After passing the check, the MCC locates a multimedia session between the MCC and the DTF that is combinational with the two sessions according to the information, and generates a multimedia handover indication (the multimedia handover indication includes a media component provided by the MCC UE that is supported in the handover destination network and an ID of a session to be handed over between the MCC and the DTF). The MCC initiates a session request to the DTF by carrying the generated information, and forwards the session request to the DTF for processing via the IMS network.

In Step C, after receiving the handover request carrying the multimedia handover indication, the DTF finds a session with a remote user according to original session identification information carried in the context, and updates the media according to an SIP media change flow.

In Step D, after the media is updated, a session/call on the old bearer is released. The releasing the multimedia session to be handed over before the media negotiation includes one of the following manners. If the DTF initiates the release, the MCC releases the multimedia session to be handed over before the media negotiation after receiving a release message sent from the DTF. If the MCC UE initiates the release, the MCC releases a multimedia session between the MCC and the DTF after receiving a release message sent from the MCC UE.

Figure 16:
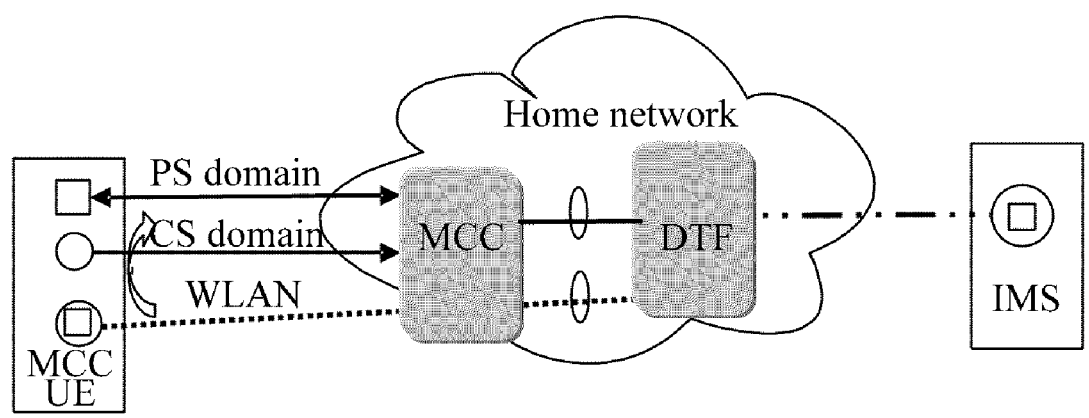
FIG. 16 is a schematic view illustrating a second manner for initiating the handover request in the access network where the combination bearer resides by the MCC UE according to an embodiment of the present invention.

A second manner for initiating a handover request for a multimedia session is shown in FIG. 16. The square denotes a non-real-time media, the circle denotes a real-time media, the circle enclosed square denotes a multimedia, and two ellipses denote two sessions for the DTF. The MCC UE first initiates one handover request, and the MCC determines and instructs the MCC UE to initiate the other handover request according to information in the request. The respective bearing of real-time and non-real-time media in the CS and PS is merely taken as an example for illustration herein, and the present invention is not limited thereto. According to the following different cases, the MCC entity may also not be placed in a signaling path of a session performed by the MCC UE through the multimedia bearer.

The handover request carries handover context information at least including a session handover indication, information of a multimedia component supported by the MCC UE in a destination side network, related identification information of a media to be handed over (including, but not limited to, an ID of a session where the media to be handed over resides), and an indication of whether any other media component needs to be handed over.

The initiating the handover request for the multimedia session in the second manner includes the following steps.

In Step A, the MCC UE calls handover numbers/identification numbers denoting networks of session handovers on a real-time or non-real-time media handover destination network, and carries required handover context information.

In Step B, after receiving the request, when any other media is to be handed over according to an indication of the handover context information, the MCC determines a handover number used by the media to be handed over and returns the handover number to the MCC UE in a response message of the request.

In Step C, after receiving the handover number, the MCC UE immediately calls the handover number in a handover destination network of the media to be handed over in the indication of the handover context information.

In Step D, after receiving the second media handover request, once the MCC determines that a called number thereof is a handover number allocated by the MCC itself, the MCC may associate real-time and non-real-time sessions. The MCC generates a multimedia handover indication according to an original multimedia session between the MCC and the DTF located by an original session ID (that may be derived from identification information of the media to be handed over) derived from the received handover context information that is combinational with this session as well as SIP SDP information in the received two requests. The MCC initiates a session request to the DTF by carrying the generated information, and forwards the session request to the DTF for processing via the IMS network.

In Step E, after receiving the handover request of the multimedia session, the DTF finds a session with a remote user according to the original session ID in the multimedia handover indication carried by the MCC, and updates the media according to an SIP media change flow.

In Step F, after the media is updated, a session/call on the old bearer is released. The releasing the multimedia session to be handed over before the media negotiation includes one of the following manners. If the DTF initiates the release, the MCC releases the multimedia session to be handed over before the media negotiation after receiving a release message sent from the DTF. If the MCC UE initiates the release, the MCC releases a multimedia session between the MCC and the DTF after receiving a release message sent from the MCC UE.

Figure 17:
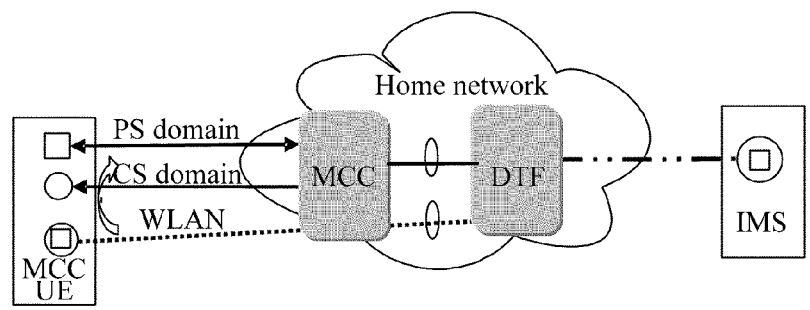
FIG. 17 is a schematic view illustrating a third manner for initiating the handover request in the access network where the combination bearer resides by the MCC UE according to an embodiment of the present invention.

A third manner for initiating a handover request for a multimedia session is shown in FIG. 17. The square denotes a non-real-time media, the circle denotes a real-time media, the circle enclosed square denotes a multimedia, and two ellipses denote two sessions for the DTF. The MCC UE first initiates one handover request, and the MCC initiates the other handover request to the MCC UE according to an indication in the request. The respective bearing of real-time and non-real-time media in the CS and PS is merely taken as an example for illustration herein, and the present invention is not limited thereto. According to the following different cases, the MCC entity may also not be placed in a signaling path of a session performed by the MCC UE through the multimedia bearer.

The handover request carries handover context information at least including: a session handover indication, information of a multimedia component supported by the MCC UE in a destination side network, an ID of a session where a media to be handed over resides (or be related identification information of the media to be handed over), and an indication of whether any other media component needs to be handed over. If any media component still needs to be handed over, the handover context information further includes information of a handover destination network of the media component.

The initiating the handover request for the multimedia session in the third manner includes the following steps.

In Step A, the MCC UE calls handover numbers/identification numbers of a user denoting networks of session handovers on a real-time or non-real-time media handover destination network, and carries handover context information.

In Step B, after receiving the request carrying the handover context information, when it indicates that other media is to be handed over, the MCC calls the user in an indicated handover destination network and instructs to perform a handover on the media to be handed over (the MCC UE may be indicated by identifying a calling number as a parameter, field, and message body determined by the MCC or any other displayed parameter, field, and message body) so that the MCC may definitely associate the real-time and non-real-time sessions.

In Step C, after receiving the call initiated by the MCC, the MCC UE identifies the handover of the media to be handed over initiated by the network according to the indication in the call, i.e., returns, in a response message, SDP information of the media to be handed over that is supported by the terminal in the access network.

In Step D, after receiving the SDP on the second session, the MCC generates a multimedia handover indication according to an original multimedia session between the MCC and the DTF located by an original session ID derived from the received handover context information that is combinational with this session as well as SIP SDP information in the received two requests. The MCC initiates a session request to the DTF by carrying the generated information, and forwards the session request to the DTF for processing via the IMS network.

In Step E, after receiving the handover request of the multimedia session, the DTF finds a session with a remote user according to the original session ID in the multimedia handover indication carried by the MCC, and updates the media according to an SIP media change flow.

In Step F, after the media is updated, a session/call on the old bearer is released. The releasing the multimedia session to be handed over before the media negotiation includes one of the following manners. If the DTF initiates the release, the MCC releases the multimedia session to be handed over before the media negotiation after receiving a release message sent from the DTF. If the MCC UE initiates the release, the MCC releases a multimedia session between the MCC and the DTF after receiving a release message sent from the MCC UE.

The three manners for initiating the handover request for the multimedia session in the above parallel media negotiation are also applicable to a serial media negotiation. After receiving one of the two real-time and non-real-time handover requests, the MCC instructs the DTF to perform the media negotiation with the remote user in a mode of serial media negotiation so as to hand over the media session. When the MCC receives the other handover request and the media negotiation of the DTF on the previous handover ends, the MCC initiates a media renegotiation to the DTF so as to update a media session established after the previous handover with related media information carried in the other handover request.

In the serial media negotiation, the releasing the multimedia session to be handed over before the media negotiation includes one of the following manners. If the MCC initiates the release, the MCC releases the multimedia session to be handed over before the media negotiation. If the MCC UE initiates the release, the MCC releases a multimedia session between the MCC and the DTF after receiving a release message sent from the MCC UE.

In order to achieve a better effect, if the direction of the requested handover is from the multimedia bearer to the combination bearer, the MCC UE may further determine whether a multimedia session quality needs to be degraded before initiating a multimedia session handover, and carry related information of a media session capable of being handed over and a quality degradation indication in the handover context information according to a determined result. The MCC generates a multimedia handover indication and sends the indication to the DTF according to the related information of the media session capable of being handed over. Meanwhile, the MCC releases media resources with a degraded multimedia session quality between the MCC and the MCC UE.

For example, when the MCC UE hands over the WLAN bearer of the multimedia session to the combination bearer combined by the CS and PS, only one media is ensured to be handed over due to reasons such as the access network does not support the DTM or multi RAB.

In Step A, the MCC UE calls a handover number/ID for denoting a network of a session handover in a destination network expecting to hand over a media, and carries handover context information. The handover context information at least indicates information whether any other media needs to be handed over, identification information of a session to be handed over on a handover source network, an indication of whether quality is degraded in this handover, and information of a media component supported by the MCC UE in the handover destination network.

In Step B, upon the reception of the handover context information carrying a handover quality degradation indication, the MCC organizes a multimedia handover indication by using SDP information in the session received at this time and a corresponding ID of an original multimedia session between the MCC and the DTF (without waiting for any other combinational session), and forwards the handover request to the DTF via the IMS network after replacing the handover context information.

In Step C, the DTF finds a session with the remote user according to the original session ID in the multimedia handover indication carried by the MCC, and renegotiates the media with the remote end according to an SIP media change flow.

In Step D, after the media renegotiation is completed, the DTF or the MCC UE releases the original session (including media resources with a degraded multimedia session quality between the MCC and the MCC UE).

In the specific implementation, the above handover context information and multimedia handover indication are carried in the following manners.

In the CS, the following three manners are provided.

(1) The MCC UE carries the above information in a user-to-user (User2User) data cell of a domain handover request. After receiving the request, a visited mobile switching center (VMSC) triggers the request to a CAMEL application entity (CAMELService) of a user for storage through a User2User data cell in a CAMEL Initial DP message. When the domain handover request in the CS domain is routed to the IMS network, a CSAF interacts with the CAMELService to acquire the information and carries the information in an SIP session request message when assembling the message. The carrying manner is the same as that when the information is delivered in the IMS domain. Afterwards, the information is triggered to the MCC in the SIP session request message so as to be delivered from the MCC UE to the MCC.

(2) The MCC UE carries the above information in a User2User data cell of a domain handover request. After receiving the request, a VMSC delivers the cell through inter-office signaling, for example, an integrated services digital network user part, ISUP, a bearer independent call control, BICC, etc., converts the request into any form or combination of a parameter, header field, or message body in SIP signaling by an IMS network interworking entity MGCF, and finally delivers it to the MCC through the SIP signaling.

(3) The MCC UE carries the above information in a User2User data cell of a domain handover request. After receiving the request, an AGF converts the request into any form or combination of a parameter, header field, or message body in SIP signaling, and finally delivers it to the MCC through the SIP signaling.

When delivered in the IMS network, the above information is delivered by extending a header field, a field, or a message body in SIP signaling.

In view of the above, a general description of the method according to the embodiment of the present invention is provided. The contents of the parallel media negotiation and serial media negotiation in the above part that the MCC UE initiates the handover request for the access to the combination bearer in the handover destination network are also applicable to the part that the MCC UE initiates the handover request for the access to the multimedia bearer in the handover destination network.

The method provided by the embodiment of the present invention is illustrated in detail below with nine embodiments of the method.

Figure 18:
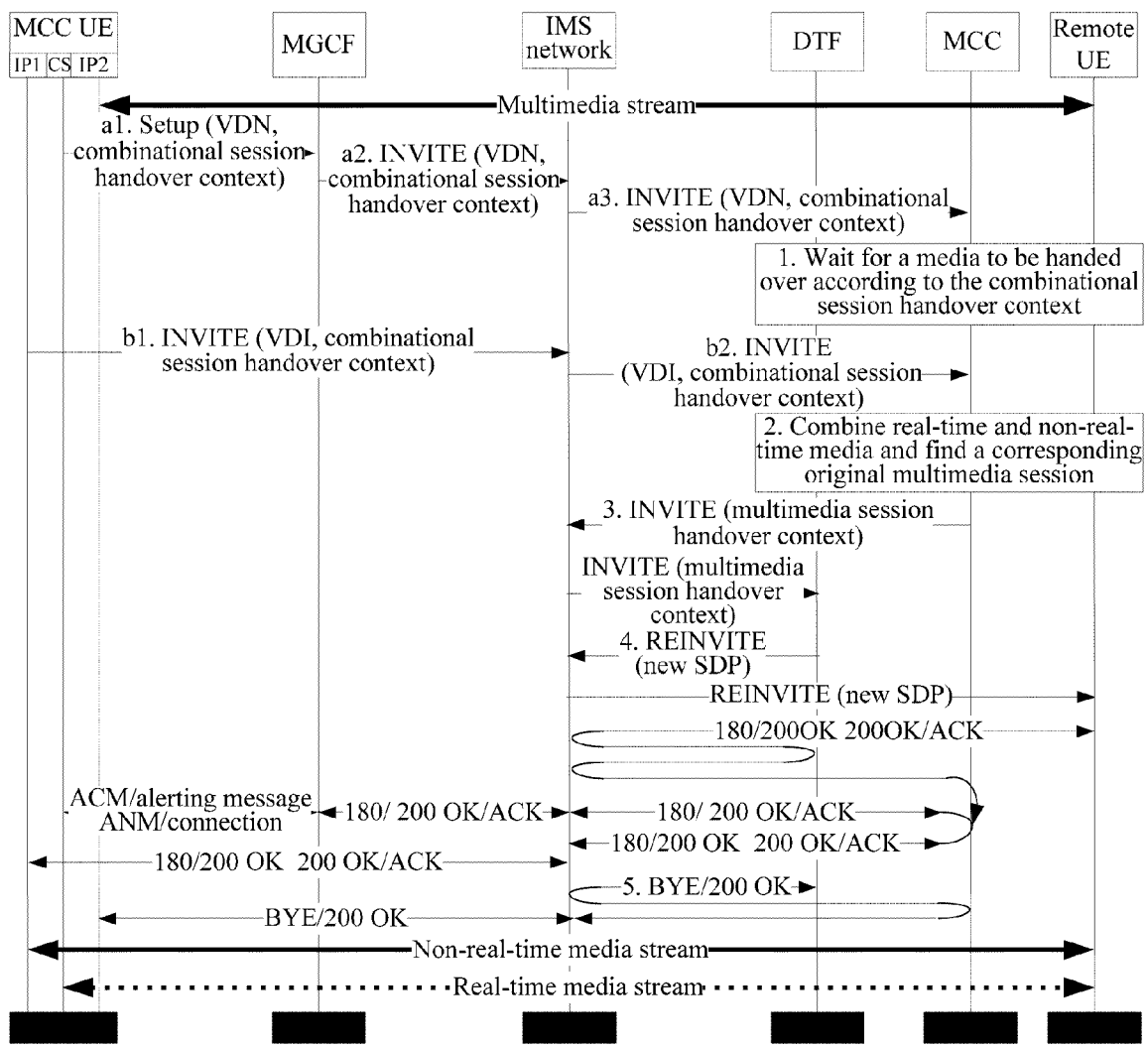
FIG. 18 is a signaling flow chart of a method according to a first embodiment of the present invention.

In a first embodiment according to a method, a mode in which real-time and non-real-time handovers are initiated correspondingly is provided. (Note: (1) Here, the bearing of a real-time media by the CS and the bearing of a non-real-time media by the PS are taken as an example, the multimedia session may also be handed over to any combination of the CS bearer and an IP-CAN bearer by applying this method, and the media on combination bearers may be combined arbitrarily according to attributes of the bearers and all can achieve the purpose of handing over the multimedia session to a combinational bearer network. (2) In this embodiment, a DTF initiates a media renegotiation with a remote session in a REINVITE manner, but may also use other media change flows in the SIP, for example, UPDATE. (3) This embodiment may be applied to the systems of the first, second, fourth, and fifth embodiments, and when this embodiment is applied to the deployment manner in which an MCC is co-installed with the DTF, the MCC interacts with the DTF via an internal interface. (4) This embodiment only shows key processing entities, and does not include all network entities. (5) The media negotiation performed with the remote end and the establishment process of a new session in a destination network may be in other orders, and this embodiment only gives a preferred implementation manner.) Referring to FIG. 18, the precondition is that, an MCC UE has carried out an IMS multimedia conversation with a remote UE in an IP2 access mode, and the MCC entity and the DTF entity have been anchored in a signaling path of the established call. The method includes the following steps.

In Steps a1-a3, the MCC UE initiates a handover request for the real-time media in the CS domain, and carries handover context information including an indication that the non-real-time media needs to be handed over and identification information that can locate an original session in a domain handover source network. The IMS network entity first forwards the session to the MCC for processing according to an iFC triggering mechanism.

In Step 1, if the MCC receives the real-time media handover request first, the MCC determines to wait for the non-real-time handover request according to the handover context.

In Steps b1-b2, the MCC UE first initiates the handover request for the non-real-time media in an IP-CAN1, and carries handover context information including an indication that a real-time media still needs to be handed over and identification information that can locate an original session in a handover source network. The IMS network entity first forwards the session to the MCC for processing according to the iFC triggering mechanism, and the MCC does not initiate the renegotiation at once on receiving the session.

In Steps 2-3, the MCC generates a multimedia handover indication according to media information in the two handover requests and an ID of a session with the DTF to be handed over that is located by an original session ID derived from the handover context information, initiates a session request to the DTF, and carries this information. The session request is forwarded to the DTF after a processing of the IMS network. (The MCC carries new SDP information in the SDP information of the session, and denotes the ID of the session to be handed over by extending or using a header field (for example, replace), a field, or a message body of the existing SIP signaling.)

In Step 4, after receiving the session request carrying the multimedia handover indication information, the DTF initiates the media renegotiation with a remote user on a remote leg located according to the context information based on the newly provided SDP.

In Step 5, after the new bearer is established, the DTF releases a designated session in the handover source network. (Or the MCC UE initiates the release.)

Figure 19:
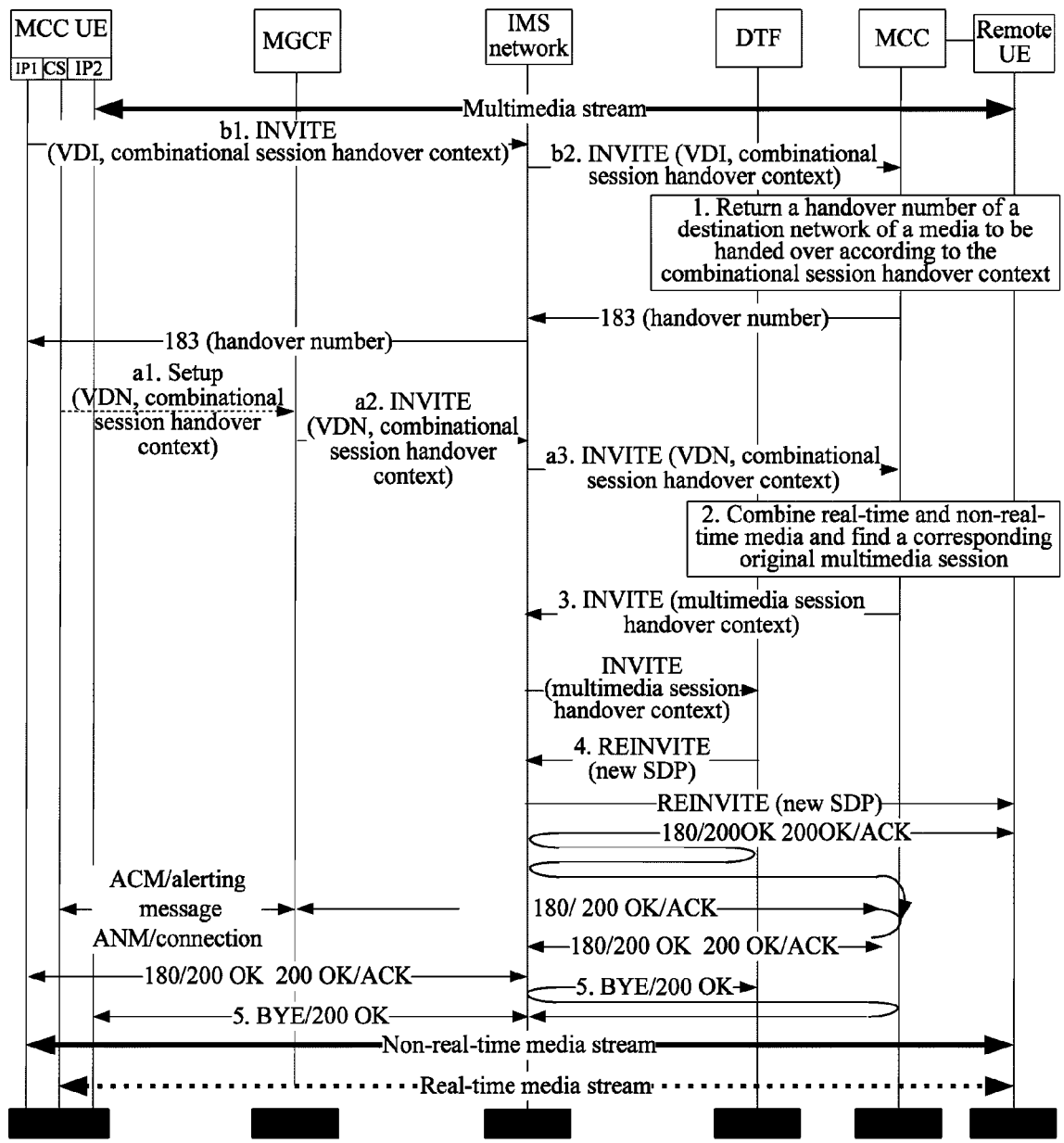
FIG. 19 is a signaling flow chart of a method according to a second embodiment of the present invention.

In a second embodiment according to a method, a mode in which according to information in a first domain handover request, the network instructs an MCC UE to initiate the other handover is provided. (Note: (1) Here, that the handover of a real-time media is performed after the handover of a non-real-time media is taken as an example, but the present invention is not limited to this order. (2) This embodiment may be applied to the systems of the first, second, fourth, and fifth embodiments, and when this embodiment is applied to the deployment manner in which an MCC is co-installed with a DTF, the MCC interacts with the DTF via an internal interface. (3) Here, the bearing of the real-time media by the CS is taken as an example, and other IP-CANs may also be used to bear the real-time media by applying this method, which both can achieve the purpose of handing over a multimedia session to a CSI combined bearer network. (4) In this embodiment, the DTF initiates a media renegotiation with a remote session in a REINVITE manner, but may also use other media change flows in the SIP, for example, UPDATE. (5) This embodiment only shows key processing entities, and does not include all network entities. (6) The media negotiation performed with the remote end and the establishment process of a new session in a destination network may be in other orders, and this embodiment only gives a preferred implementation manner.) Referring to FIG. 19, the precondition is that, the MCC UE has carried out an IMS multimedia conversation with a remote UE in an IP2 access mode, and the MCC entity and the DTF entity have been anchored in a signaling path of the established call. The method includes the following steps.

In Steps b1-b2, the MCC UE first initiates a handover request for the non-real-time media in a destination domain, and carries handover context information denoting an indication that a real-time media still needs to be handed over and identification information that can locate an original session in a domain handover source network. The IMS network entity first forwards the session to the MCC for processing according to an iFC triggering mechanism.

In Step 1, the MCC determines that a real-time media still needs to be handed over according to the handover context, determines a handover number that the real-time media will use, and returns the handover number to the MCC UE in a temporary response.

In Steps a1-a3, after receiving the number, the MCC UE initiates a domain handover flow of the real-time media in the CS domain by using the number as a called number.

In Steps 2-3, the MCC generates a multimedia handover indication according to media information in the two handover requests and an ID of a session with the DTF to be handed over that is located by original session identification information derived from the handover context information, initiates a session request to the DTF, and carries this information. The session request is forwarded to the DTF after a processing of the IMS network. (The MCC carries new SDP information in the SDP information of the session, and denotes the ID of the session to be handed over by extending or using a header field (for example, replace), a field, or a message body of the existing SIP signaling.)

In Step 4, after receiving the session request carrying the multimedia handover indication information, the DTF initiates the media renegotiation with a remote user on a remote leg located according to the context information based on the newly provided SDP.

In Step 5, after the new bearer is established, the DTF releases a designated session in the handover source network. (Or, the MCC UE initiates the release.)

Figure 20:
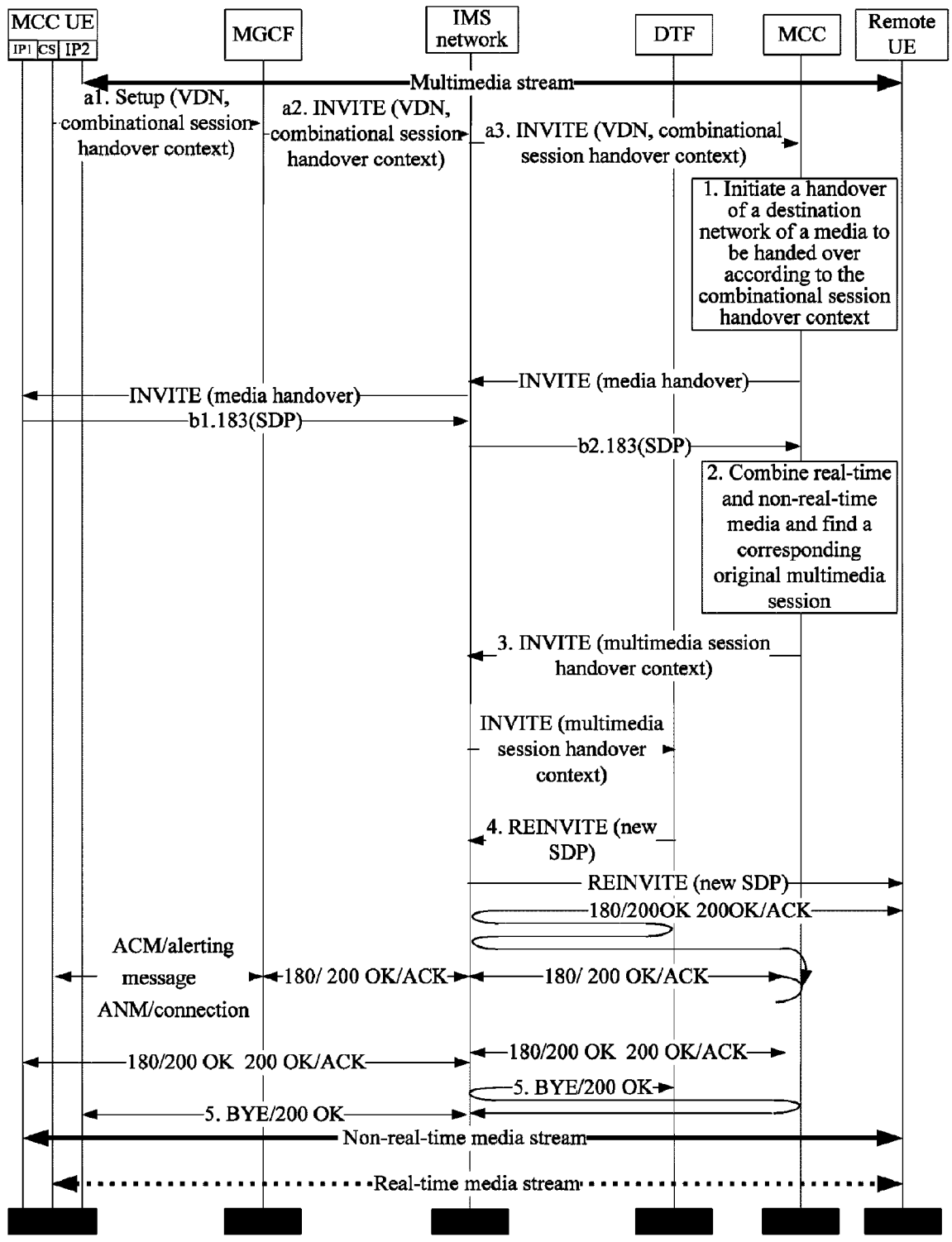
FIG. 20 is a signaling flow chart of a method according to a third embodiment of the present invention.

In a third embodiment according to a method, a mode in which an MCC UE initiates one handover request first and the network initiates the other handover according to an indication in the request is provided. (Note: (1) Here, that the handover of a non-real-time media is performed after the handover of a real-time media is taken as an example, but the present invention is not limited to this order. (2) Here, the bearing of the real-time media by the CS is taken as an example, and other IP-CANs may also be used to bear the real-time media by applying this method, which both can achieve the purpose of handing over a multimedia session to a combination bearer. (3) In this embodiment, a DTF initiates a media renegotiation with a remote session in a REINVITE manner, but may also use other media change flows in the SIP, for example, UPDATE. (4) This embodiment may be applied to the systems of the first, second, fourth, and fifth embodiments, and when this embodiment is applied to the deployment manner in which an MCC is co-installed with the DTF, the MCC interacts with the DTF via an internal interface. (5) This embodiment only shows key processing entities, and does not include all network entities. (6) The media negotiation performed with the remote end and the establishment process of a new session in a destination network may be in other orders, and this embodiment only gives a preferred implementation manner.) Referring to FIG. 20, the precondition is that, the MCC UE has carried out an IMS multimedia conversation with a remote UE in an IP2 access mode, and the MCC entity and the DTF entity have been anchored in a signaling path of the established call. The method includes the following steps.

In Steps a1-a3, the MCC UE first initiates a handover request for the real-time media in a destination domain, and carries handover context information denoting that a non-real-time media still needs to be handed over and related information that can derive an original session ID in a domain handover source network. The IMS network entity first forwards the session to the MCC for processing according to an iFC triggering mechanism.

In Step 1, the MCC determines that a non-real-time media still needs to be handed over according to the handover context, and calls the MCC UE on an IP-CAN1 to indicate a non-real-time media handover.

In Steps b1-b2, after receiving the call, the MCC UE provides an offer of the non-real-time media in a temporary response according to the fact that a calling number is an MCC PSI number.

In Steps 2-3, the MCC generates a multimedia handover indication according to media information in the two handover requests and an ID of a session with the DTF to be handed over that is located by original session identification information derived from the handover context information, initiates a session request to the DTF, and carries this information. The session request is forwarded to the DTF after a processing of the IMS network. (The MCC carries new SDP information in the SDP information of the session, and denotes the ID of the session to be handed over by extending or using a header field (for example, replace), a field, or a message body of the existing SIP signaling.)

In Step 4, after receiving the session request carrying the multimedia handover indication information, the DTF initiates the media renegotiation with a remote user on a remote leg located according to the context information based on the newly provided SDP.

In Step 5, after the new bearer is established, the DTF releases a designated session in the handover source network. (Or, the MCC UE initiates the release.)

Figure 21:
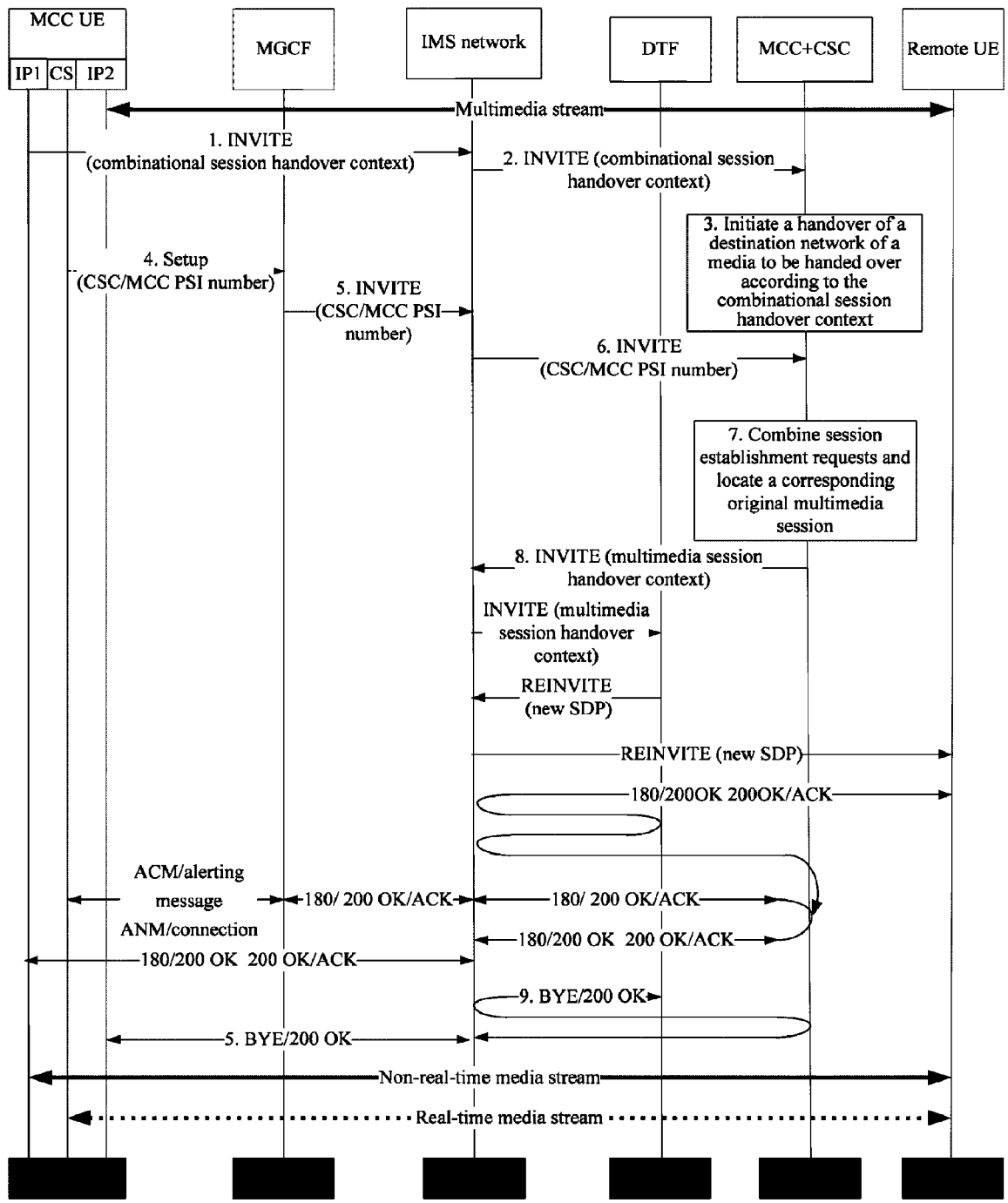
FIG. 21 is a signaling flow chart of a method according to a fourth embodiment of the present invention.

In a fourth embodiment according to a method, an MCC UE initiates a call request through the PS and carries information of a handover to a joint bearer. (Note: (1) This embodiment only shows key processing entities, and does not include all network entities. (2) Here, the bearing of a real-time media by the CS is taken as an example, and the present invention is not limited thereto. (3) In this embodiment, a DTF initiates a media renegotiation with a remote session in a REINVITE manner, but may also use other media change flows in the SIP, for example, UPDATE. (4) This embodiment may be applied to the system of the third embodiment, and when this embodiment is applied to the deployment manner in which an MCC is co-installed with the DTF, the MCC interacts with the DTF via an internal interface. (5) The media negotiation performed with the remote end and the establishment process of a new session in a destination network may be in other orders, and this embodiment only gives a preferred implementation manner. (6) This embodiment takes a co-installation of the MCC and a CSC as an example, and the present invention is not limited thereto. (7) Although only a most preferred embodiment of the combination between CS and PS sessions is provided, other manners may also be adopted, for example, associating the two sessions through a calling number and a handover indication, and re-associating the two sessions after restoring calling and called numbers through a CSAF and a CAMEL service in conjunction when an ISUP is unavailable in the case of a cross international office.) Referring to FIG. 21, the precondition is that, the MCC UE has carried out an IMS multimedia conversation with a remote UE in an IP2 access mode, the MCC entity and the DTF entity have been anchored in a signaling path of the established call, and the MCC UE supports the control of a session establishment on a CS bearer through the PS. The method includes the following steps.

In Steps 1-2, the MCC UE first initiates a call request to a non-real-time media of a special called number (for example, VDI) on a destination IP1, and carries handover context information denoting that a real-time media still needs to be handed over and identification information that can locate an original session in a domain handover source network. An IMS network entity first forwards the session to the MCC/CSC for processing according to an iFC triggering mechanism.

In Step 3, the MCC/CSC determines that a real-time media still needs to be handed over according to the handover context and waits for a session establishment request on the CS bearer so as to associate the two session requests. Optionally, the MCC/CSC, for example, allocates a dynamic handover number VDN by carrying combination information between a CS session and a PS session on the IP1 in a backward response of the IP1 session establishment request, for example, 183. The number may be a PSI number in the IMS network directed to an AS where the MCC/CSC resides.

In Steps 4-6, after receiving the response, the MCC UE employs the allocated handover number as the called number. As the called number is the PSI number of the MCC/CSC, the call request may be forwarded to the AS where the MCC/CSC resides for processing according to a routing manner of the PSI number. (When the two sessions are combinational through a calling number and a handover indication, the handover number may be configured in the MCC UE without waiting for a dynamic allocation of the network, and at this time, Steps 4 and 1 are performed concurrently to reduce an establishment delay of the handover signaling.)

In Step 7, the MCC/CSC associates the two sessions according to the fact that the called number is the handover number allocated in the IP1 call, generates a multimedia handover indication according to an ID of a session with the DTF to be handed over that is located by an original session ID in the handover context information carried in the IP1 session and according to the handover context information and media information in the session request, and assembles the handover information into an SIP session establishment request message (the MCC carries new SDP information in the SDP information of the session, and denotes the ID of the session to be handed over by extending or using a header field (for example, replace), a field, or a message body of the existing SIP signaling; or may denote access network information related to the compound session in a header field, a field, or a message body of the SIP signaling, for example, including access network information on the CS and IP1 for the DTF or AS of other services).

In Step 8, the MCC/CSC forwards the session request to the IMS network. The session request is forwarded to the DTF for processing through iFC triggering. After receiving the session request carrying the multimedia handover indication information, the DTF initiates the media renegotiation with a remote user on a remote leg located according to the context information based on the newly provided SDP.

In Step 9, after the new bearer is established, the DTF releases a designated session in the handover source network. (Or, the MCC UE initiates the release.)

Figure 22:
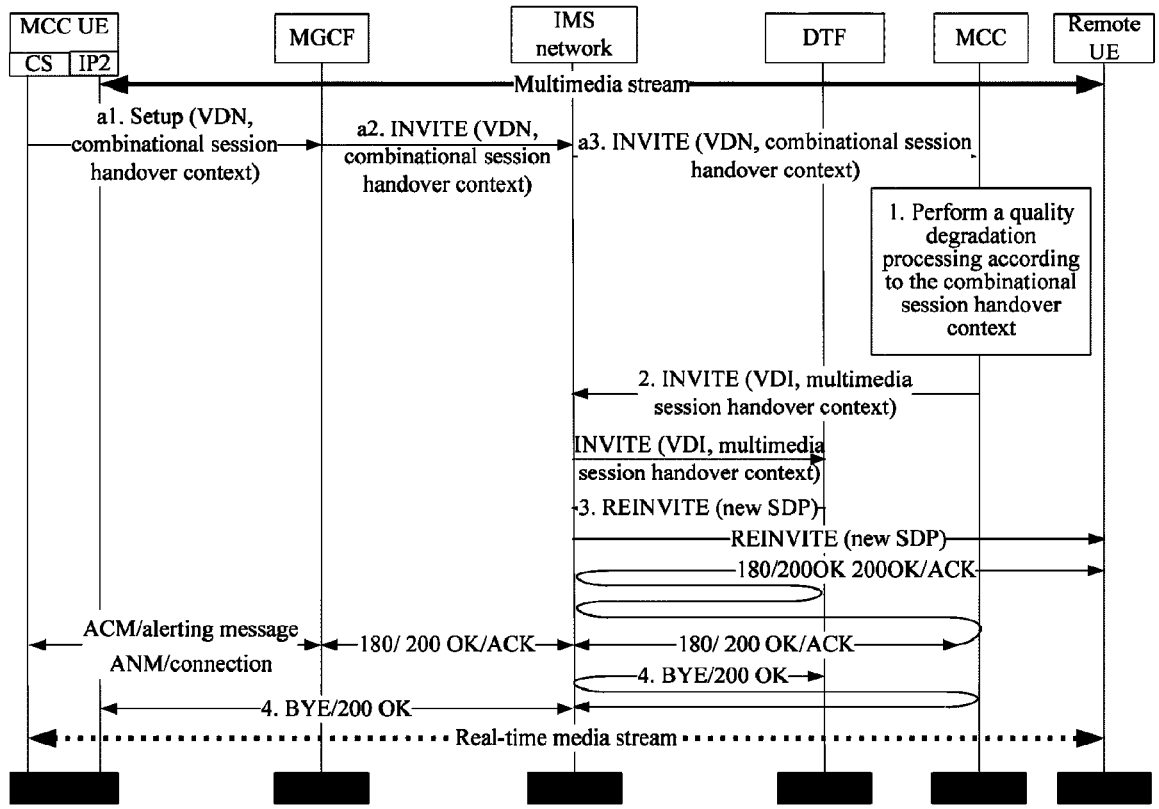
FIG. 22 is a signaling flow chart of a method according to a fifth embodiment of the present invention.

In a fifth embodiment according to a method, a multimedia session is handed over from an IP-CAN2 to an access network not supporting the DTM so that a real-time media is ensured to be handed over to the CS and a non-real-time media is released due to a quality degradation. (Note: (1) A quality degradation indication in this embodiment takes a reporting of the DTM capability of the access network by an MCC UE as an example, but the actual application is not limited thereto, and information denoted by any terminal to the network that the quality needs to be degraded in the current handover conforms to the essence of this embodiment of the present invention. (2) In this embodiment, a DTF initiates a media renegotiation with a remote session in a REINVITE manner, but may also use other media change flows in the SIP, for example, UPDATE. (3) This embodiment may be applied to the systems of the first to fifth embodiments, and when this embodiment is applied to the deployment manner in which an MCC is co-installed with the DTF, the MCC interacts with the DTF via an internal interface. (4) This embodiment only shows key processing entities, and does not include all network entities. (5) The media negotiation performed with the remote end and the establishment process of a new session in a destination network may be in other orders, and this embodiment only gives a preferred implementation manner. (6) Step a3 may also directly trigger the session to the DTF for processing.) Referring to FIG. 22, the method includes the following steps.

In Steps a1-a3, the MCC UE first initiates a handover request for a real-time media in a destination domain, and carries handover context information including a quality degradation indication (the reason for the quality degradation in this embodiment is that the access network does not support the DTM) and an original session ID in a domain handover source network. An IMS network entity first forwards the session to the MCC for processing according to an iFC triggering mechanism.

In Steps 1-2, if the MCC determines that only the current media can be handed over according to the quality degradation indication, the MCC generates a multimedia handover indication based on media information in the handover request and an ID of a session with the DTF to be handed over that is located by an original session ID derived from the handover context information, initiates a session request to the DTF, and carries this information. The session request is forwarded to the DTF after a processing of the IMS network. (The MCC carries new SDP information in the SDP information of the session, and denotes the ID of the session to be handed over by extending or using a header field (for example, replace), a field, or a message body of the existing SIP signaling.)

In Step 3, after receiving the session request carrying the multimedia handover indication information, the DTF initiates the media renegotiation with a remote user on a remote leg located according to the context information based on the newly provided SDP.

In Step 4, after a CS bearer of the real-time media is established successfully, the DTF releases a designated session in the handover source network. (Or, the MCC UE initiates the release.)

Figure 23:
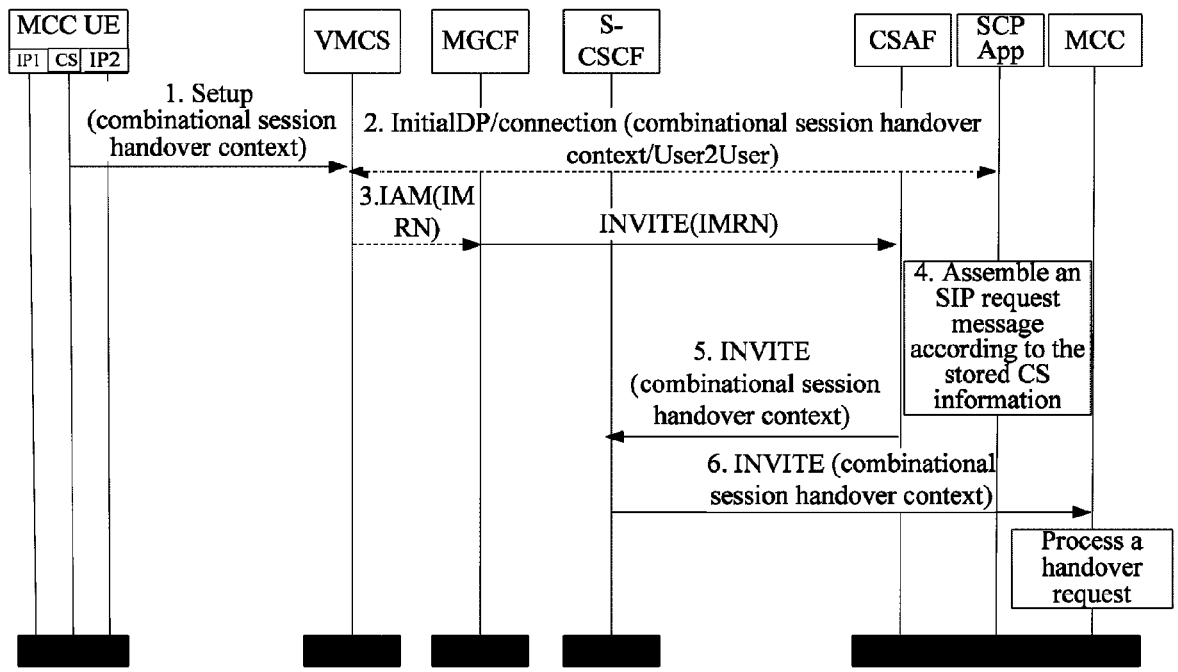
FIG. 23 is a signaling flow chart of a method according to a sixth embodiment of the present invention.

In a sixth embodiment according to a method, a first manner in which handover context information is delivered to an MCC in a CS access is provided. (Note: (1) This embodiment may be applied to the systems of the first, second, fourth, and fifth embodiments. (2) This embodiment only shows key processing entities, and does not include all network entities.) Referring to FIG. 23, the method includes the following steps.

In Step 1, an MCC UE carries a combinational session domain handover context in a User2User cell to be delivered to an end office VMSC for processing via a user network interface.

In Step 2, the VMSC delivers through a CAMEL InitialDP message information received from the User2User cell to an SCP application (here, the SCP App denotes the whole of the gsmSCP and CAMEL Service entities, and the CAMEL message should be first triggered to the gsmSCP and delivered to the CAMEL Service via an internal interface) in a home IMS network of the user according to a user subscription. The SCP App itself allocates a routing number of the IMS network, IMRN, or interacts with a CSAF to allocate the IMRN, and returns the IMRN to the VMSC in an IDP response message.

In Step 3, the VMSC routes the call to a gateway MGCF of the IMS network for processing according to the switched number. The MGCF forwards the call to the CSAF entity via an Ma interface.

In Step 4, the CSAF interacts with the SCP application to obtain stored CS domain information when receiving a call routed from the CS domain, and assembles the above information to an appropriate SIP information field when assembling an SIP session request according to the CS domain information.

In Step 5, the CSAF forwards the call to the S-CSCF for processing.

In Step 6, the S-CSCF triggers the call to an AS where the MCC resides according to an iFC.

Figure 24:
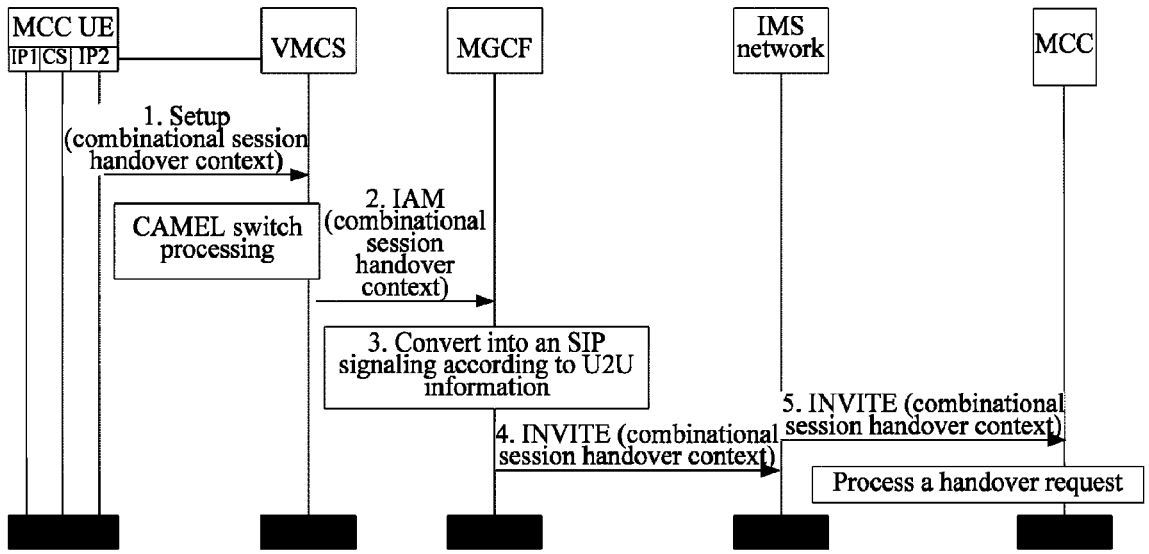
FIG. 24 is a signaling flow chart of a method according to a seventh embodiment of the present invention.

In a seventh embodiment according to a method, a second manner in which handover context information is delivered to an MCC in a CS access is provided. (Note: (1) This embodiment may be applied to the systems of the first, second, fourth, and fifth embodiments. (2) This embodiment only shows key processing entities, and does not include all network entities.) Referring to FIG. 24, the method includes the following steps.

In Step 1, the MCC UE carries handover context information in a User2User cell to be delivered to an end office VMSC for processing via a user network interface.

In Step 2, the VMSC assembles the received User2User cell to a User2User information unit in an inter-office signaling (ISUP or BICC), and switches the call to an MGCF for processing according to a CMAEL switch processing.

In Step 3, the MGCF converts the User2User information unit into a parameter, a header field, or a message body of an SIP session request, and assembles the request into an SIP message.

In Steps 4-5, after the SIP session request is routed to an IMS network, a session control entity of the IMS network, for example, an S-CSCF, forwards the request to an AS where the MCC resides according to a calling iFC triggering mechanism.

Figure 25:
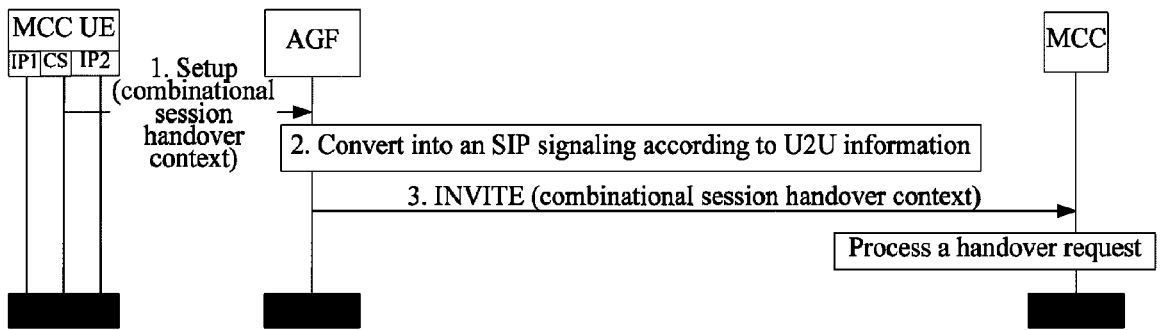
FIG. 25 is a signaling flow chart of a method according to an eighth embodiment of the present invention.

In an eighth embodiment according to a method, a third manner in which handover context information is delivered to an MCC in a CS access is provided. (Note: (1) The method of this embodiment may be applied to the system of the fifth embodiment. (2) This embodiment only shows key processing entities, and does not include all network entities.) Referring to FIG. 25, the method includes the following steps.

In Step 1, the MCC UE carries handover context information in a User2User cell and delivers the cell to an AGF for processing via a user network interface.

In Step 2, the AGF converts the received User2User cell into a parameter, a header field, or a message body of an SIP session request, and assembles the request into an SIP message.

In Step 3, the AGF forwards the SIP session request to a home IMS network of the user according to information at a registration, and a related entity of the IMS network, for example, an S-CSCF, triggers the call to the MCC for processing according to a calling iFC.

Figure 26:
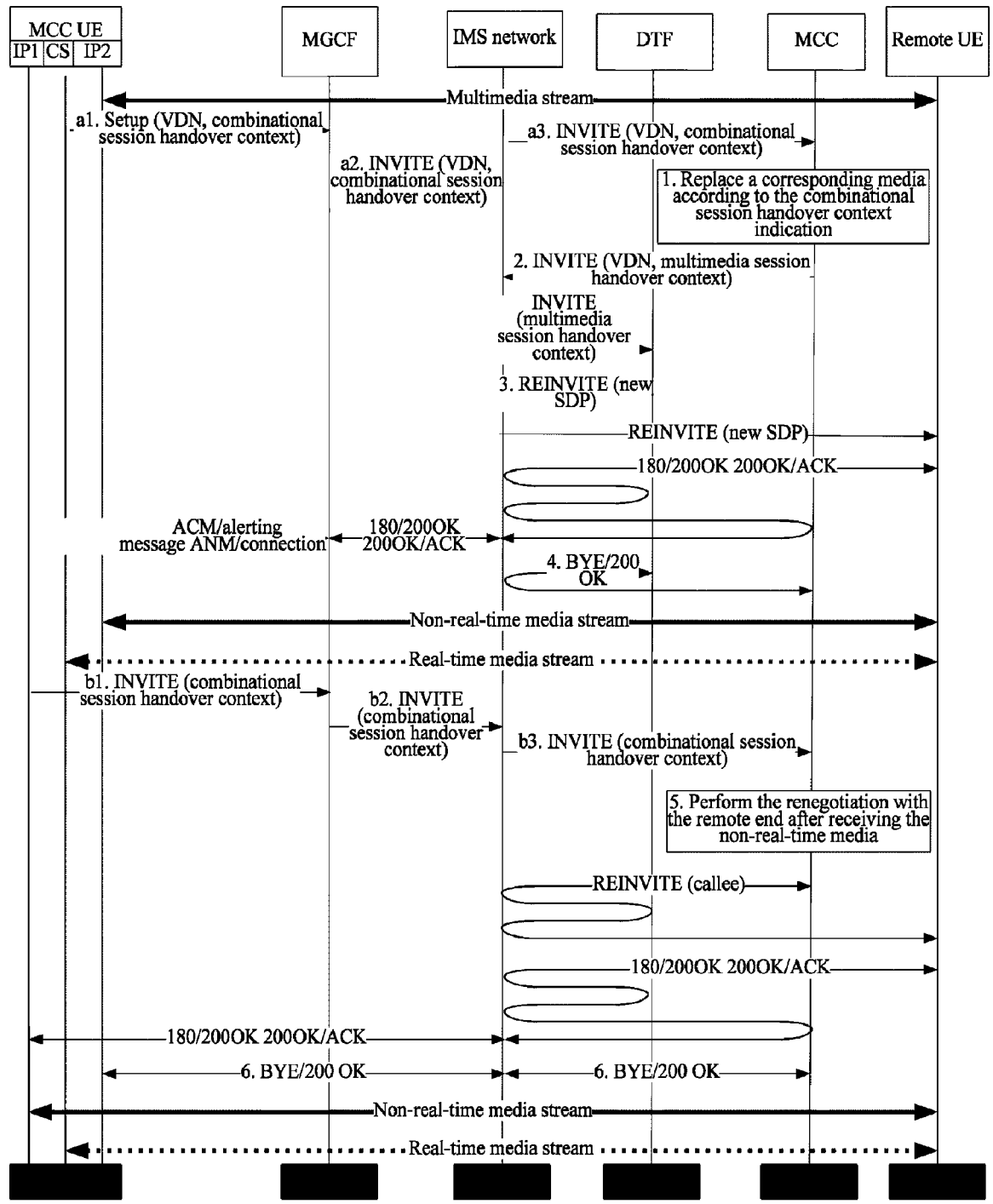
FIG. 26 is a signaling flow chart of a method according to a ninth embodiment of the present invention.

In a ninth embodiment according to a method, a mode of serial media negotiation in a manner of initiating real-time and non-real-time handovers correspondingly is provided. (Note: (1) Here, the bearing of the real-time media by the CS is taken as an example, and other IP-CANs may also be used to bear the real-time media by applying this method, which both can achieve the purpose of handing over a multimedia session to a CSI combination bearer network. (2) In this embodiment, the DTF initiates a media renegotiation with a remote session in a REINVITE manner, but may also use other media change flows in the SIP, for example, UPDATE. (3) This embodiment may be applied to the systems of the first, second, fourth, and fifth embodiments, and when this embodiment is applied to the deployment manner in which an MCC is co-installed with the DTF, the MCC interacts with the DTF via an internal interface. (4) This embodiment only shows key processing entities, and does not include all network entities. (5) The media negotiation performed with the remote end and the establishment process of a new session in a destination network may be in other orders, and this embodiment only gives a preferred implementation manner.) Referring to FIG. 26, the method includes the following steps.

In Steps a1-a3, an MCC UE first initiates a handover request for the real-time media in a CS domain, and carries handover context information denoting that a non-real-time media still needs to be handed over and an original session ID in a domain handover source network. An IMS network entity first forwards the session to the MCC for processing according to an iFC triggering mechanism.

In Step 1, if the MCC first receives a session request carrying the handover context information, the MCC determines that a non-real-time media is to be handed over according to the handover context, locates an original multimedia session between the MCC and the DTF in a serial manner, replaces the corresponding real-time media with a new real-time media, and generates a multimedia handover indication by using the original multimedia session ID.

In Step 2, the MCC initiates a session request to the DTF by carrying the multimedia handover indication, and forwards the session request to the DTF for processing via the IMS network.

In Step 3, the DTF locates a session with a remote user according to this information and performs the media renegotiation on the located session by using a newly provided SDP.

In Step 4, after the new bearer is established, the DTF releases a designated session in a handover source network, and on receiving a release request, the MCC continues waiting for a non-real-time media handover request.

In Steps b1-b3, the MCC UE first initiates the non-real-time media handover request in an IP-CAN1, and carries handover context information including an indication that no other media needs to be handed over and an original session ID.

In Step 5, after receiving the request, the MCC locates a corresponding session between the MCC and the DTF according to an ID of a session to be handed over in the context information, and initiates a media negotiation on this session so that the received non-real-time media information replaces a corresponding part in a multimedia component in the corresponding session between the MCC and the DTF.

In Step 6, after the media renegotiation is completed, the MCC releases the designated session in the handover source network. (Or, the MCC UE may initiate the release.)

Figure 27:
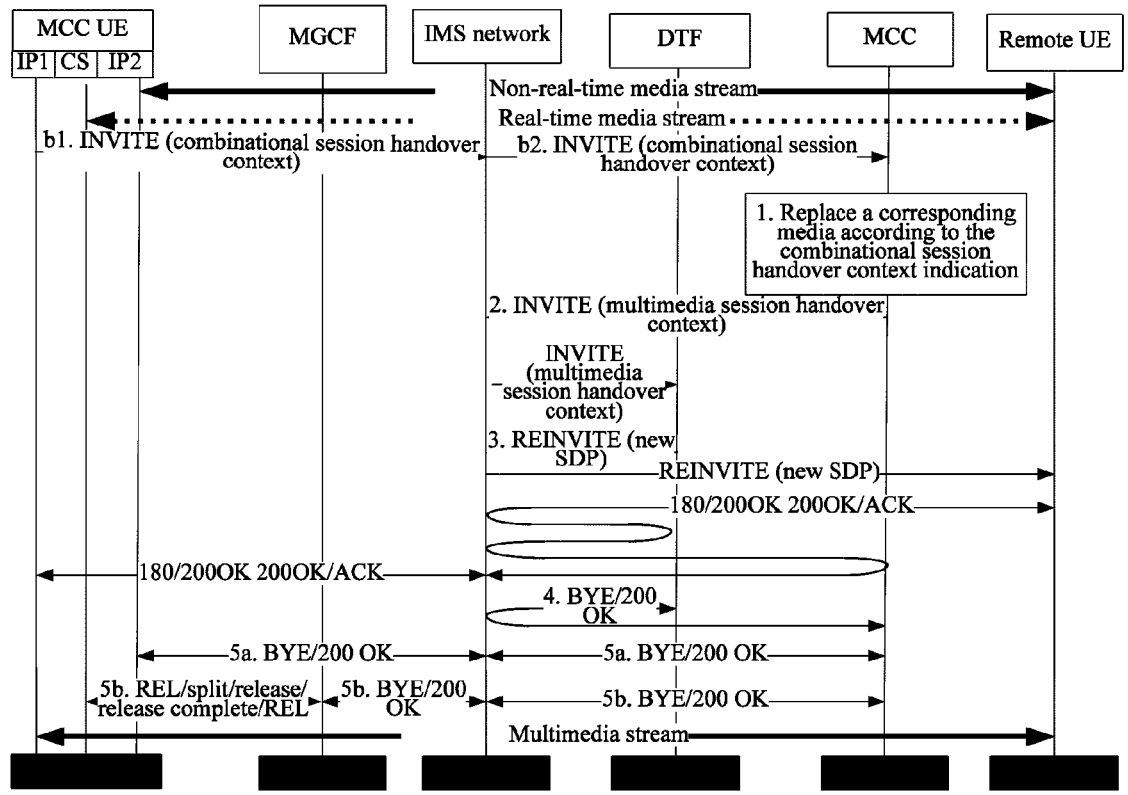
FIG. 27 is a signaling flow chart of a method according to a tenth embodiment of the present invention.

In a tenth embodiment according to a method, a session is handed over from a combination bearer to a multimedia bearer. (Note: (1) In this embodiment, a DTF initiates a media renegotiation with a remote session in a REINVITE manner, but may also use other media change flows in the SIP, for example, UPDATE. (2) This embodiment may be applied to the systems of the first to fifth embodiments, and when this embodiment is applied to the deployment manner in which an MCC is co-installed with the DTF, the MCC interacts with the DTF via an internal interface. (3) This embodiment only shows key processing entities, and does not include all network entities. (4) The media negotiation performed with the remote end and the establishment process of a new session in a destination network may be in other orders, and this embodiment only gives a preferred implementation manner. (5) Step b2 and subsequent steps may also directly trigger a processing in the DTF without going through the MCC, and the MCC releases sessions on the two combination bearers after receiving a release indication from the DTF.) Referring to FIG. 27, the method includes the following steps.

In Steps b1-b2, an MCC UE initiates a multimedia session request on a multimedia bearer IP-CAN1, and carries handover context information denoting a multimedia handover and an original session ID in a handover source network. An IMS network entity first forwards the session to the MCC for processing according to an iFC triggering mechanism.

In Step 1, if the MCC first receives a session request carrying the handover context information, the MCC locates an original multimedia session between the MCC and the DTF according to the original session ID in the handover context, and generates a multimedia handover indication by using a new multimedia component and the original multimedia session ID.

In Step 2, the MCC initiates a session request to the DTF by carrying the multimedia handover indication, and forwards the session request to the DTF for processing via the IMS network.

In Step 3, the DTF locates a session with a remote user according to this information, and performs the media renegotiation on the located session by using a newly provided SDP.

In Step 4, after the new bearer is established, the DTF releases a designated session in a handover source network, and on receiving a release request, the MCC continues waiting for a non-real-time media handover request.

After the MCC receives the request, the MCC releases the designated session in the handover source network. Step 5a is a flow of releasing a non-real-time media session, and Step 5b is a flow of releasing a real-time media session. (Or, the MCC UE releases the two sessions respectively.)

Figure 28:
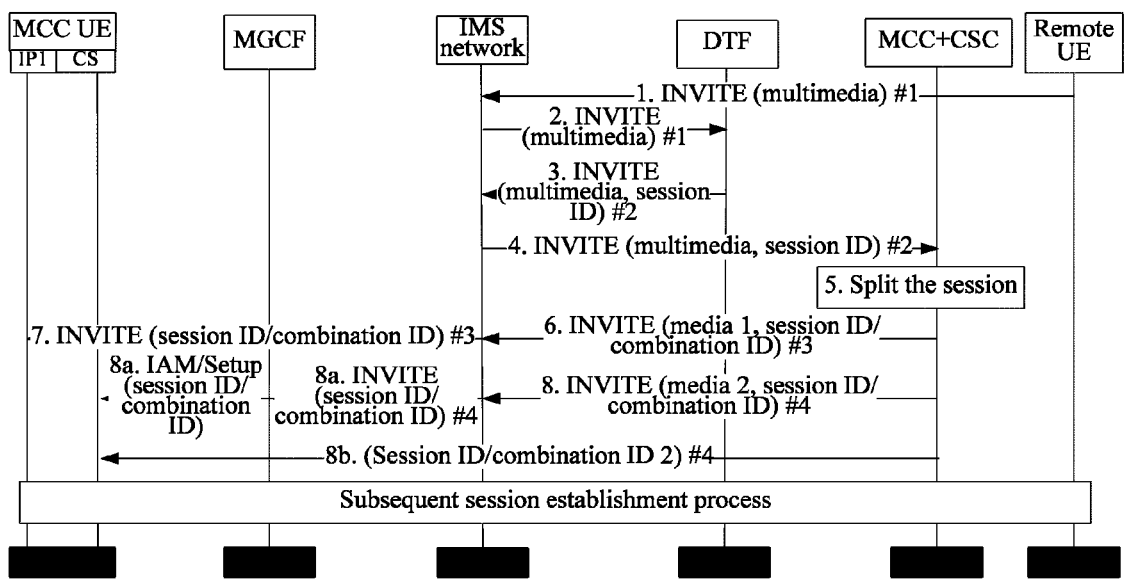
FIG. 28 is a signaling flow chart of a method according to an eleventh embodiment of the present invention.

In an eleventh embodiment according to a method, an MCC UE exchanges information with network as a callee. (Note: (1) This embodiment may be applied to the systems of the first to fifth embodiments, and when this embodiment is applied to the deployment manner in which an MCC is co-installed with a DTF, the MCC interacts with the DTF via an internal interface. (2) This embodiment only shows key processing entities, and does not include all network entities.) Referring to FIG. 28, the method includes the following steps.

In Steps 1-2, a multimedia call (identified by #1) of a remote UE reaches a home network of the MCC UE and is triggered to the DTF for anchoring.

In Steps 3-5, when the DTF and the MCC are disposed separately, the DTF allocates one session ID (the ID may be a dialog ID of an SIP session or any other generated ID that can uniquely determine one session at the DTF by any means) and forwards the multimedia call (identified by #2 after being anchored) to the MCC for processing via an IMS network. The MCC decides to split the multimedia session according to properties of an access network registered by a destination MCC UE, network policies, and so on.

In Steps 6-7, the MCC splits a part of the session to a PS bearer and carries a session ID and a combination ID in a session establishment request. The information is sent to the MCC UE through an SIP session establishment request or other call request messages. The MCC UE requests a session indicated by a DTF handover according to the session ID. The MCC UE determines whether a session on the access bearer and a session on another access bearer on the UE are combinational sessions with each other according to the combination ID. (Or, the two IDs may be realized by one parameter, for example, if sessions on different access bearers receive the same session ID, the sessions can be determined as combinational sessions with each other; and the session ID and the combination ID may be carried in the SIP session by various parameters, header fields, fields, and message bodies thereof.)

In Steps 8-8a, when the session information and combination information is delivered in a CS access of the MCC UE, information in the SIP session may be converted into a User2User information unit in the CS by an interworking entity, for example, an MGCF, and delivered to the MCC UE.

In Step 8b, when the MCC UE supports a communication with a CSC function, the information may be delivered via an unstructured supplementary service data (USSD) channel between the MCC UE and the CSC function.

After receiving the information, the MCC UE stores, matches, and determines the information, and releases these IDs correspondingly when the call is released.

In view of the above, in the embodiments of the present invention, an MCC UE is newly added to initiate a handover request for a multimedia session between a combination bearer and a multimedia bearer, and carry handover context information in the handover request. Besides, the function of an MCC is added. The MCC generates a multimedia handover indication and sends the indication to the DTF according to the handover context information, so as to map a process that a multimedia session between the MCC UE and the MCC is handed over between the combination bearer and the multimedia bearer to a process that a multimedia session between the MCC and the DTF is handed over between different access modes. Moreover, the function of the DTF is added. The DTF performs a media negotiation with a remote UE according to the multimedia handover indication, so as to complete the handover of the multimedia session between the MCC and the DTF between different access modes.

Therefore, the problem of handover of a multimedia session on a multi-mode terminal between bearers of different access modes is solved without influencing the existing flow of the VCC, thereby providing call continuity for the multimedia session of the multi-mode terminal. As such, the call continuity capability is enhanced, the provision scope of the call continuity by the operator is expanded, and thus the scale of the service profit is potentially increased.

It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. A multi-mode terminal, comprising:
    an initiating unit, adapted to initiate a handover request for a multimedia session, wherein a direction of the requested handover is from a combination bearer to a multimedia bearer or from the multimedia bearer to the combination bearer, and the combination bearer is a combination of at least two access network bearer modes jointly bearing the multimedia session;
    an information adding unit, adapted to add handover context information in the handover request initiated by the initiating unit;
    a release unit, adapted to release the multimedia session to be handed over before a media negotiation after the media negotiation succeeds;
    a remote session information storage unit, adapted to store information sent from a network side notifying whether each combinational session between a multimedia call continuity (MCC) and a multimedia call continuity capable user equipment (MCC UE) is corresponding to one multimedia session between the MCC and a remote UE in a call establishment process when the MCC UE acts as a callee; and
    a number indication unit, adapted to indicate a number of the handover request initiated by the initiating unit according to the information stored by the remote session information storage unit when the initiating unit intends to initiate the handover request for handing over the combination bearer to the multimedia bearer.

2. The multi-mode terminal according to claim 1, further comprising:
    a handover quality degradation determining unit, adapted to determine whether a multimedia session quality needs to be degraded before the initiating unit initiates the handover request, and notify the information adding unit to carry related information of a media session handed over in the handover context information according to a determined result.

3. A method for providing multimedia session continuity, comprising:
    providing a domain transfer function (DTF) of a signaling anchor between a first access leg and a remote leg, wherein the first access leg is established between the DTF and a multimedia call continuity capable user equipment (MCC UE) through a multimedia bearer, the remote leg is established between the DTF and a remote UE, and the MCC UE communicates with the remote UE via the DTF;
    initiating, by the MCC UE, a handover request carrying handover context information, wherein a direction of the requested handover is from the multimedia bearer to a combination bearer, and the combination bearer is a combination of at least two access network bearer modes jointly bearing a multimedia session;
    receiving, by the DTF, a second access leg establishment request carrying the handover context information initiated by the MCC UE;
    establishing a second access leg between the MCC UE and the DTF;
    performing, by the DTF, a media negotiation with the remote UE according to the handover context information and switching the remote leg to the second access leg, and the MCC UE continues communicating with the remote UE;

wherein the initiating the handover request comprises one of the following manners:

in a first manner, the MCC UE initiates a handover request on each combination bearer correspondingly in a destination side network;

in a second manner, the MCC UE initiates a handover request on one combination bearer, and a MCC determines and instructs the MCC UE to initiate handover requests on other combination bearers according to information in the handover request;

in a third manner the MCC UE initiates a handover request on one combination bearer, and the MCC initiates to the MCC UE session establishment requests on other combination bearers according to an indication in the handover request so as to acquire media information required by the handover request; and after receiving handover information on each combination bearer through one of the above three manners, the method further comprising instructing by the MCC the DTF to perform the media negotiation with the remote UE in a mode of parallel media negotiation;

wherein in the first manner and the second manner, the handover request carries the handover context information comprising at least:

a session handover indication, information of a media supported by the MCC UE in each combinational bearer network at a destination side and corresponding to a media component to be handed over, an ID of a media to be handed over, and an indication whether any other media component needs to be handed over;

wherein the initiating the handover request for the multimedia session in the first manner comprises:

determining, by the MCC, whether all related handover requests are received according to the indication of whether any other media component needs to be handed over after receiving one of the handover requests on the combination bearers;

determining whether media sessions corresponding to the handover requests are combinational session with each other according to whether original session IDs in IDs of media to be handed over carried in the handover requests are the same when determining that all the related handover requests are received;

combining the handover requests;

generating a multimedia handover indication; and sending the indication to the DTF if the media sessions are combinational sessions with each other.

4. The method according to claim 3, wherein the initiating the handover request for the multimedia session in the second manner comprises:

initiating, by the MCC UE, a handover request on one combination bearer;

determining, by the MCC, whether all related handover requests are received according to the indication whether any other media component needs to be handed over, and allocating a handover number and returning the number to the MCC UE if the MCC determines that not all the related handover requests are received;

initiating, by the MCC UE, handover requests on other combination bearers by calling the handover number, and determining, by the MCC, whether media sessions corresponding to the handover requests are combinational sessions with each other according to the handover number; and combining, by the MCC, the handover requests, generating a multimedia handover indication and sending the indication to the DTF.

5. The method according to claim 3, further comprising:

determining by the MCC UE whether a multimedia session quality needs to be degraded before initiating a multimedia session handover, and carrying related information of a media session capable of being handed over and a quality degradation indication in the handover context information according to a determined result;

after identifying the quality degradation indication, directly generating the MCC UE a multimedia handover indication according to the related information of the media session capable of being handed over and sending the indication to the DTF; and after a media negotiation succeeds, releasing jointly media resources with a degraded multimedia session quality between the MCC and the MCC UE in a related network element (NE).

6. A system for providing multimedia session continuity, comprising:

a remote user equipment (UE), wherein the system comprises a domain transfer function (DTF) entity of a signaling anchor between a first access leg and a remote leg, the first access leg is established between the DTF and a multimedia call continuity capable UE (MCC UE), through a multimedia bearer, the remote leg is established between the DTF and the remote UE, and the MCC UE communicates with the remote UE via the DTF; and afterwards, when a handover occurs, the MCC UE is adapted to initiate a handover request carrying handover context information wherein a direction of the requested handover is from a multimedia bearer to a combination bearer, and the combination bearer is a combination of at least two access network bearer modes jointly bearing the multimedia session; and the DTF is adapted to receive a second access leg establishment request carrying the handover context information, establish a second access leg between the MCC UE and the DTF, perform a media negotiation with the remote UE according to the handover context information and switch the remote leg to the second access leg; and the MCC UE continues communicating with the remote UE;

wherein the MCC UE determines whether a multimedia session quality needs to be degraded before initiating a handover request, and carries related information of a media session capable of being handed over and a quality degradation indication in the handover context information according to a determined result; and after identifying the quality degradation indication, the MCC directly generates a multimedia handover indication according to the related information of the media session being handed over and sends the indication to the DTF.

7. The system according to claim 6, wherein the determining whether the multimedia session quality needs to be degraded comprises one of the following policies:

determining whether the capability of a handover destination side supports a current multimedia session attribute, and if the capability of the handover destination side does not support the current multimedia session attribute, an intersection part between the capability of the handover destination side and the current multimedia session attribute is carried in the handover context information;

degrading the multimedia session quality configured by the MCC UE according to a policy; and
according to a user's indication.

8. A method for providing multimedia session continuity, comprising:
providing a domain transfer function (DTF) of a signaling anchor between a first access leg and a remote leg, wherein the first access leg is established between the DTF and a multimedia call continuity capable user equipment (MCC UE) through a multimedia bearer, the remote leg is established between the DTF and a remote UE, and the MCC UE communicates with the remote UE via the DTF;
initiating, by the MCC UE, a handover request carrying handover context information, wherein a direction of the requested handover is from the multimedia bearer to a combination bearer, and the combination bearer is a combination of at least two access network bearer modes jointly bearing a multimedia session;
receiving, by the DTF, a second access leg establishment request carrying the handover context information initiated by the MCC UE;
establishing a second access leg between the MCC UE and the DTF; and
performing, by the DTF, a media negotiation with the remote UE according to the handover context information and switching the remote leg to the second access leg, and the MCC UE continues communicating with the remote UE;
wherein the initiating the handover request comprises one of the following manners:
in a first manner, the MCC UE initiates a handover request on each combination bearer correspondingly in a destination side network;
in a second manner, the MCC UE initiates a handover request on one combination bearer, and a MCC determines and instructs the MCC UE to initiate handover requests on other combination bearers according to information in the handover request; and
in a third manner, the MCC UE initiates a handover request on one combination bearer, and the MCC initiates to the MCC UE session establishment requests on other combination bearers according to an indication in the handover request so as to acquire media information required by the handover request; and
after receiving handover information on each combination bearer through one of the above three manners, the method further comprising instructing by the MCC the DTF to perform the media negotiation with the remote UE in a mode of parallel media negotiation;
wherein in the first manner and the second manner, the handover request carries the handover context information comprising at least:
a session handover indication, information of a media supported by the MCC UE in each combinational bearer network at a destination side and corresponding to a media component to be handed over, an ID of a media to be handed over, and an indication whether any other media component needs to be handed over;
wherein the initiating the handover request for the multimedia session in the second manner comprises:
initiating, by the MCC UE, a handover request on one combination bearer;
determining, by the MCC, whether all related handover requests are received according to the indication whether any other media component needs to be handed over, and allocating a handover number and returning the number to the MCC UE if the MCC determines that not all the related handover requests are received;
initiating, by the MCC UE, handover requests on other combination bearers by calling the handover number, and determining, by the MCC, whether media sessions corresponding to the handover requests are combinational sessions with each other according to the handover number; and
combining, by the MCC, the handover requests, generating a multimedia handover indication and sending the indication to the DTF.

9. The method according to claim 8, wherein the initiating the handover request for the multimedia session in the first manner comprises:
determining, by the MCC, whether all related handover requests are received according to the indication of whether any other media component needs to be handed over after receiving one of the handover requests on the combination bearers;
determining whether media sessions corresponding to the handover requests are combinational session with each other according to whether original session IDs in IDs of media to be handed over carried in the handover requests are the same when determining that all the related handover requests are received;
combining the handover requests;
generating a multimedia handover indication; and
sending the indication to the DTF if the media sessions are combinational sessions with each other.

10. The method according to claim 8, further comprising:
determining by the MCC UE whether a multimedia session quality needs to be degraded before initiating a multimedia session handover, and carrying related information of a media session capable of being handed over and a quality degradation indication in the handover context information according to a determined result;
after identifying the quality degradation indication, directly generating the MCC UE a multimedia handover indication according to the related information of the media session capable of being handed over and sending the indication to the DTF; and
after a media negotiation succeeds, releasing jointly media resources with a degraded multimedia session quality between the MCC and the MCC UE in a related network element (NE).

11. A method for providing multimedia session continuity, comprising:
providing a domain transfer function (DTF) of a signaling anchor between a first access leg and a remote leg, wherein the first access leg is established between the DTF and a multimedia call continuity capable user equipment (MCC UE) through a multimedia bearer, the remote leg is established between the DTF and a remote UE, and the MCC UE communicates with the remote UE via the DTF;
initiating, by the MCC UE, a handover request carrying handover context information, wherein a direction of the requested handover is from the multimedia bearer to a combination bearer, and the combination bearer is a combination of at least two access network bearer modes jointly bearing a multimedia session;
receiving, by the DTF, a second access leg establishment request carrying the handover context information initiated by the MCC UE;
establishing a second access leg between the MCC UE and the DTF;

performing, by the DTF, a media negotiation with the remote UE according to the handover context information and switching the remote leg to the second access leg, and the MCC UE continues communicating with the remote UE;

wherein the initiating the handover request comprises one of the following manners:

in a first manner, the MCC UE initiates a handover request on each combination bearer correspondingly in a destination side network;

in a second manner, the MCC UE initiates a handover request on one combination bearer, and a MCC determines and instructs the MCC UE to initiate handover requests on other combination bearers according to information in the handover request;

in a third manner, the MCC UE initiates one handover request, and the MCC initiates call requests on other combination bearers to the MCC UE according to an indication in the handover request;

after receiving one of the handover requests on the combination bearers through one of the above three manners, the method further comprising:

instructing by the MCC the DTF to perform the media negotiation with the remote UE in a mode of serial media negotiation to hand over the media session; and when the MCC receives another handover request and the media negotiation of the DTF on a previous handover ends, initiating by the MCC a media renegotiation to the DTF so as to update a media session established after the previous handover with related media information carried in the another handover request.

12. The method according to claim 11, further comprising:
determining by the MCC UE whether a multimedia session quality needs to be degraded before initiating a multimedia session handover, and carrying related information of a media session capable of being handed over and a quality degradation indication in the handover context information according to a determined result;

after identifying the quality degradation indication, directly generating the MCC UE a multimedia handover indication according to the related information of the media session capable of being handed over and sending the indication to the DTF; and after a media negotiation succeeds, releasing jointly media resources with a degraded multimedia session quality between the MCC and the MCC UE in a related network element (NE).

13. A method for providing multimedia session continuity, comprising:
providing a domain transfer function (DTF) of a signaling anchor between a first access leg and a remote leg, wherein the first access leg is established between the DTF and a multimedia call continuity capable user equipment (MCC UE) through a multimedia bearer, the remote leg is established between the DTF and a remote UE, and the MCC UE communicates with the remote UE via the DTF;

initiating, by the MCC UE, a handover request carrying handover context information, wherein a direction of the requested handover is from the multimedia bearer to a combination bearer, and the combination bearer is a combination of at least two access network bearer modes jointly bearing a multimedia session;

receiving, by the DTF, a second access leg establishment request carrying the handover context information initiated by the MCC UE;

establishing a second access leg between the MCC UE and the DTF;

performing, by the DTF, a media negotiation with the remote UE according to the handover context information and switching the remote leg to the second access leg, and the MCC UE continues communicating with the remote UE;

the method further comprising:
determining by the MCC UE whether a multimedia session quality needs to be degraded before initiating a multimedia session handover, and carrying related information of a media session capable of being handed over and a quality degradation indication in the handover context information according to a determined result;

after identifying the quality degradation indication, directly generating the MCC UE a multimedia handover indication according to the related information of the media session capable of being handed over and sending the indication to the DTF; and after a media negotiation succeeds, releasing jointly media resources with a degraded multimedia session quality between the MCC and the MCC UE in a related network element (NE).

14. The method according to claim 13, wherein the initiating the handover request comprises one of the following manners:

in a first manner, the MCC UE initiates a handover request on each combination bearer correspondingly in a destination side network;

in a second manner, the MCC UE initiates a handover request on one combination bearer, and a MCC determines and instructs the MCC UE to initiate handover requests on other combination bearers according to information in the handover request;

in a third manner, the MCC UE initiates a handover request on one combination bearer, and the MCC initiates to the MCC UE session establishment requests on other combination bearers according to an indication in the handover request so as to acquire media information required by the handover request; and after receiving handover information on each combination bearer through one of the above three manners, the method further comprising instructing by the MCC the DTF to perform the media negotiation with the remote UE in a mode of parallel media negotiation.

15. The method according to claim 14, wherein in the first manner and the second manner, the handover request carries the handover context information comprising at least:
a session handover indication, information of a media supported by the MCC UE in each combinational bearer network at a destination side and corresponding to a media component to be handed over, an ID of a media to be handed over, and an indication whether any other media component needs to be handed over.

16. The method according to claim 15, wherein the initiating the handover request for the multimedia session in the first manner comprises:
determining, by the MCC, whether all related handover requests are received according to the indication of whether any other media component needs to be handed over after receiving one of the handover requests on the combination bearers;

determining whether media sessions corresponding to the handover requests are combinational session with each other according to whether original session IDs in IDs of media to be handed over carried in the handover requests are the same when determining that all the related handover requests are received;
combining the handover requests;
generating a multimedia handover indication; and
sending the indication to the DTF if the media sessions are combinational sessions with each other.

17. The method according to claim 15, wherein the initiating the handover request for the multimedia session in the second manner comprises:
  initiating, by the MCC UE, a handover request on one combination bearer;
  determining, by the MCC, whether all related handover requests are received according to the indication whether any other media component needs to be handed over, and allocating a handover number and returning the number to the MCC UE if the MCC determines that not all the related handover requests are received;
  initiating, by the MCC UE, handover requests on other combination bearers by calling the handover number, and determining, by the MCC, whether media sessions corresponding to the handover requests are combinational sessions with each other according to the handover number; and
  combining, by the MCC, the handover requests, generating a multimedia handover indication and sending the indication to the DTF.

18. The method according to claim 13, wherein the initiating the handover request comprises one of the following manners:
  in a first manner, the MCC UE initiates a handover request on each combination bearer correspondingly in a destination side network;
  in a second manner, the MCC UE initiates a handover request on one combination bearer, and a MCC determines and instructs the MCC UE to initiate handover requests on other combination bearers according to information in the handover request;
  in a third manner, the MCC UE initiates one handover request, and the MCC initiates call requests on other combination bearers to the MCC UE according to an indication in the handover request;
  after receiving one of the handover requests on the combination bearers through one of the above three manners, the method further comprising:
  instructing by the MCC the DTF to perform the media negotiation with the remote UE in a mode of serial media negotiation to hand over the media session; and
  when the MCC receives another handover request and the media negotiation of the DTF on a previous handover ends, initiating by the MCC a media renegotiation to the DTF so as to update a media session established after the previous handover with related media information carried in the another handover request.

* * * * *